United States Patent
Onodera et al.

(10) Patent No.: US 7,487,815 B2
(45) Date of Patent: Feb. 10, 2009

(54) TERMINAL ELECTRODE FORMING APPARATUS AND SYSTEM FOR HOLDING ELECTRONIC COMPONENTS

(75) Inventors: Ko Onodera, Tokyo (JP); Satoshi Kurimoto, Tokyo (JP)

(73) Assignee: TDK Corporation, Tokyo (JP)

( * ) Notice: Subject to any disclaimer, the term of this patent is extended or adjusted under 35 U.S.C. 154(b) by 223 days.

(21) Appl. No.: 11/183,751

(22) Filed: Jul. 19, 2005

(65) Prior Publication Data

US 2005/0247407 A1 Nov. 10, 2005

Related U.S. Application Data

(60) Continuation of application No. 10/834,000, filed on Apr. 29, 2004, now Pat. No. 6,945,299, which is a division of application No. 09/820,846, filed on Mar. 30, 2001, now Pat. No. 6,749,890.

(30) Foreign Application Priority Data

Mar. 31, 2000 (JP) .............................. 2000-098254
Mar. 15, 2001 (JP) .............................. 2001-073572

(51) Int. Cl.
*B32B 37/22* (2006.01)
*B32B 38/10* (2006.01)

(52) U.S. Cl. .................. 156/539; 156/247; 156/249; 156/344; 156/541; 156/584; 118/642; 118/423; 118/67; 118/68

(58) Field of Classification Search .............. 156/247, 156/249, 344, 539, 540, 541, 584; 118/67, 118/68, 423, 425, 642
See application file for complete search history.

(56) References Cited

U.S. PATENT DOCUMENTS

| 1,274,830 A | 8/1918 | Wood |
| 3,683,849 A | 8/1972 | Atchley et al. |

(Continued)

FOREIGN PATENT DOCUMENTS

JP   06-260377   9/1994

(Continued)

*Primary Examiner*—Mark A Osele
(74) *Attorney, Agent, or Firm*—Oblon, Spivak, McClelland, Maier & Neustadt, P.C.

(57) ABSTRACT

The invention provides an electrode forming method with steps of arraying chip-style electronic components on an arraying flat bed thereby positioning and aligning the components, lowering a film coated with an adhesive in relative manner together with an adhering top plate parallel to the arraying flat bed thereby adhering ends of the positioned and aligned chip-style electronic components to the adhesive, then lowering the first film to which the chip-style electronic components are adhered in relative manner together with a coating top plate parallel to a coating flat bed provided with a conductive paste layer of a constant thickness thereby pressing the other ends of the chip-style electronic components to the coating flat bed and coating the ends of the electronic components with the conductive paste.

2 Claims, 22 Drawing Sheets

U.S. PATENT DOCUMENTS

| | | | |
|---|---|---|---|
| 4,020,198 A | | 4/1977 | Cornelius et al. |
| 4,257,172 A | * | 3/1981 | Townsend ................... 34/68 |
| 4,381,321 A | | 4/1983 | Braden |
| 4,393,808 A | | 7/1983 | Braden |
| 4,395,184 A | | 7/1983 | Braden |
| 4,406,373 A | | 9/1983 | Braden |
| 4,526,129 A | | 7/1985 | Braden |
| 4,664,943 A | | 5/1987 | Nitta et al. |
| 4,669,416 A | | 6/1987 | Delgado et al. |
| 4,859,498 A | | 8/1989 | Yamaguchi |
| 5,120,577 A | | 6/1992 | Yamaguchi et al. |
| 5,296,262 A | | 3/1994 | Didden |
| 5,362,357 A | * | 11/1994 | Takei et al. ................ 216/12 |
| 5,366,573 A | * | 11/1994 | Bayer et al. ................ 156/64 |
| 5,383,997 A | * | 1/1995 | Minowa et al. ............ 156/235 |
| 5,540,317 A | | 7/1996 | Braden et al. |
| 5,546,678 A | * | 8/1996 | Dhaemers ................... 34/275 |
| 5,609,954 A | * | 3/1997 | Aizawa et al. ............ 428/317.5 |
| 5,622,585 A | | 4/1997 | Minowa et al. |
| 5,827,394 A | * | 10/1998 | Lu ............................ 156/344 |
| 5,894,033 A | | 4/1999 | Garcia |
| 5,981,361 A | * | 11/1999 | Yamada ..................... 438/464 |
| 6,176,966 B1 | * | 1/2001 | Tsujimoto et al. ........... 156/344 |
| 6,627,037 B1 | * | 9/2003 | Kurokawa et al. .......... 156/344 |
| 6,841,030 B2 | | 1/2005 | Sasada |
| 7,163,597 B2 | * | 1/2007 | Murata et al. ............... 156/248 |
| 7,175,728 B2 | * | 2/2007 | Kiuchi et al. ............... 156/248 |
| 2004/0003891 A1 | | 1/2004 | Cheng et al. |

FOREIGN PATENT DOCUMENTS

| | | |
|---|---|---|
| JP | 9-22847 | 1/1997 |
| JP | 2874438 B | 1/1999 |
| JP | 11-166164 | 6/1999 |
| JP | 11-302610 | 11/1999 |
| JP | 11-302614 | 11/1999 |
| JP | 11-334785 | 12/1999 |
| JP | 2000-030916 | 1/2000 |
| JP | 3049981 B | 3/2000 |
| JP | 2000-248240 | 9/2000 |
| JP | 2000-351947 | 12/2000 |

* cited by examiner

Prior Art

Prior Art

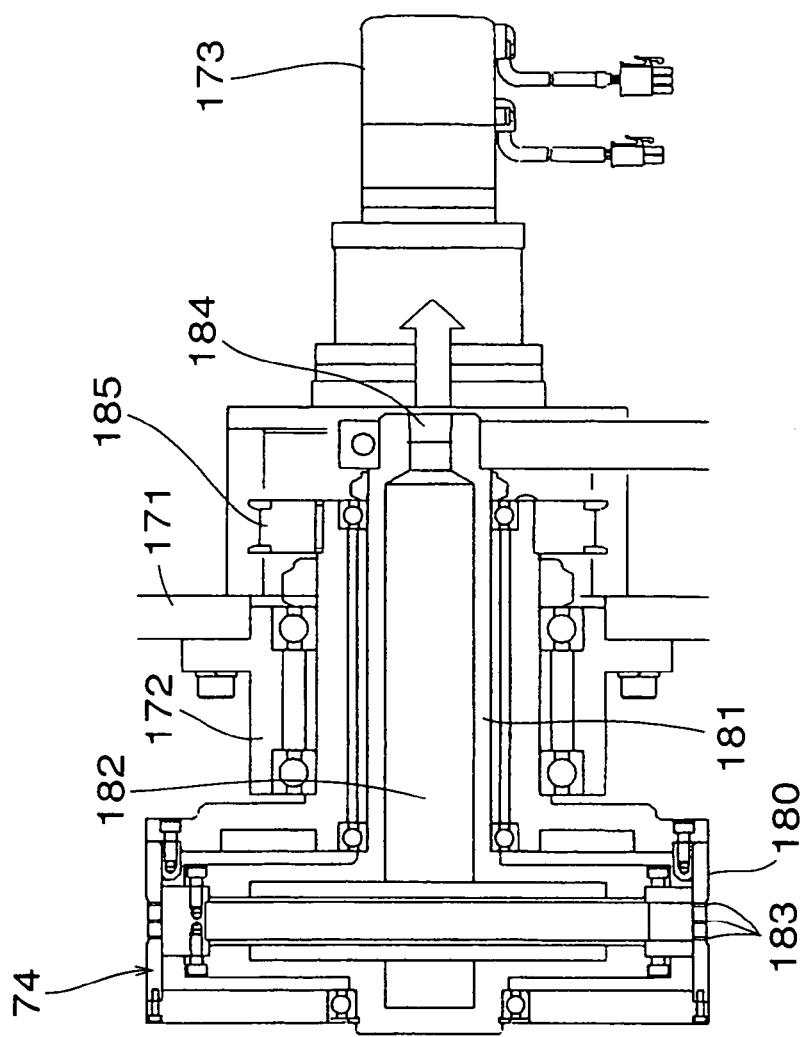
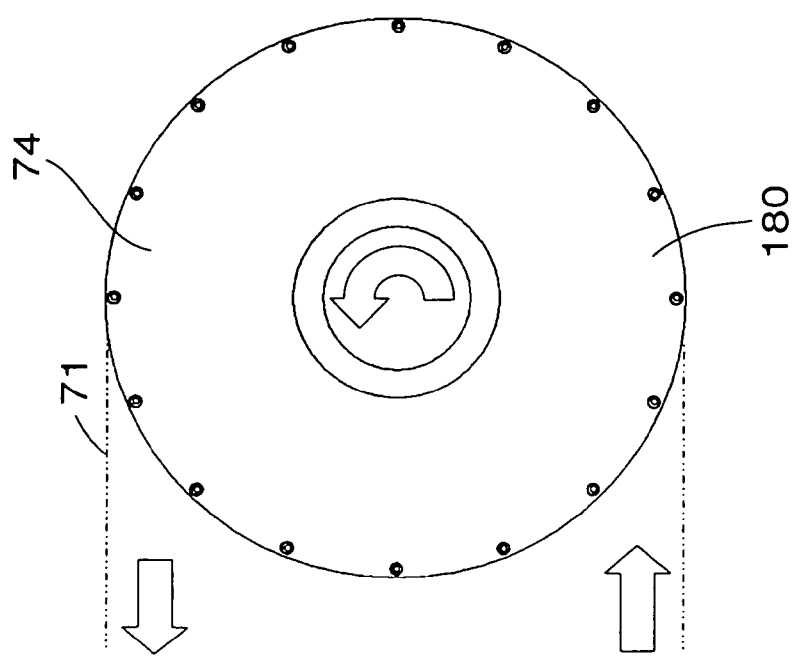

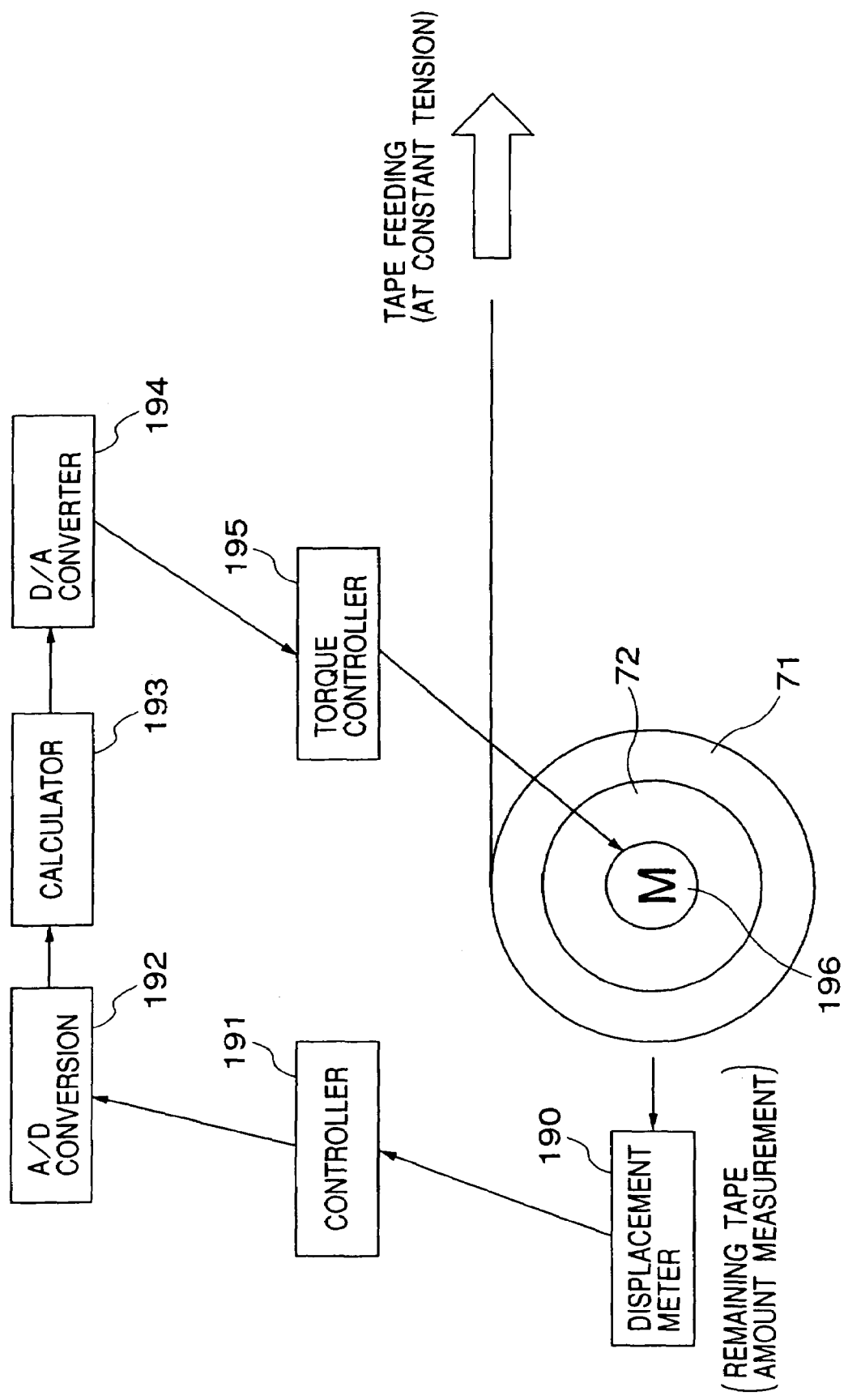

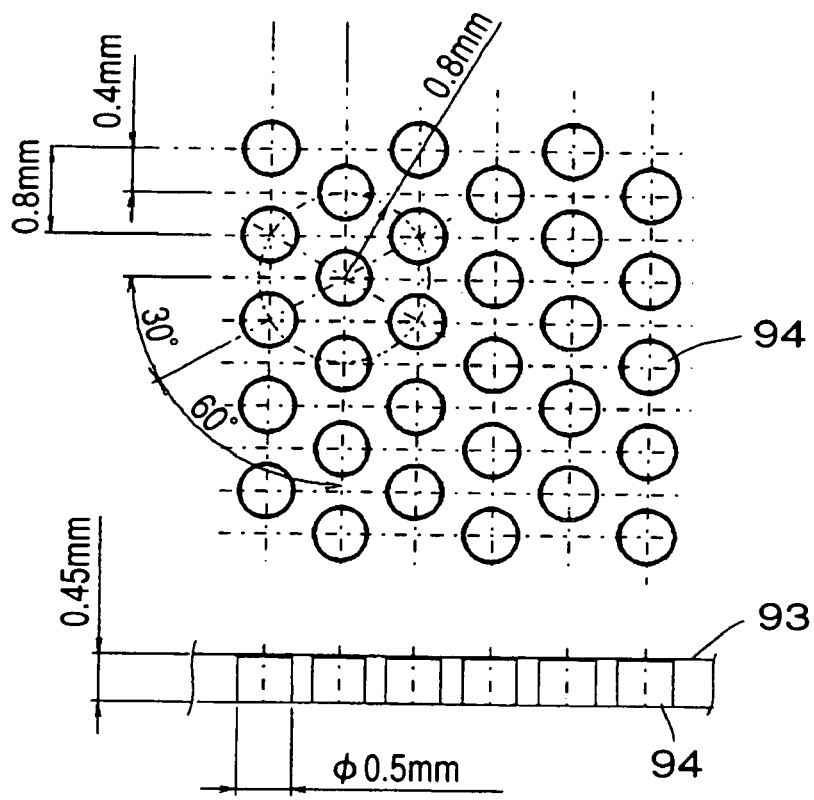
FIG. 24A
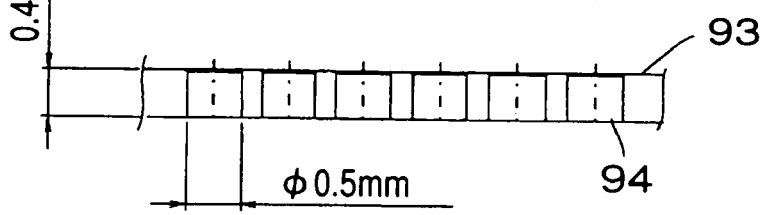
FIG. 24B
FIG. 24C
FIG. 24D
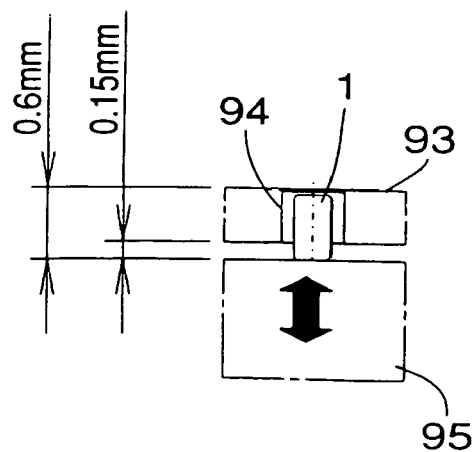
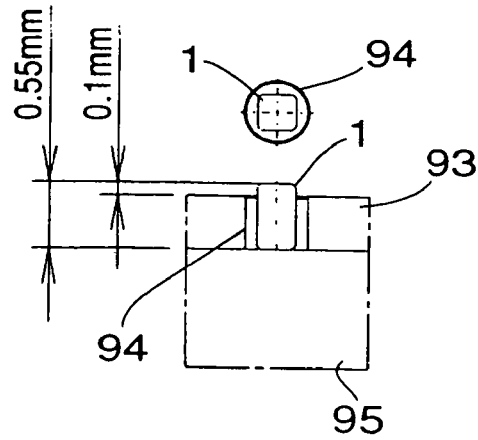

TERMINAL ELECTRODE FORMING APPARATUS AND SYSTEM FOR HOLDING ELECTRONIC COMPONENTS

This is a continuation of U.S. application Ser. No. 10/834,000, filed Apr. 29, 2004 now U.S. Pat. No. 6,945,299, which is a divisional of U.S. application Ser. No. 09/820,846, filed Mar. 30, 2001, now U.S. Pat. No. 6,749,890, issued Jun. 15, 2004, and is based upon and claims the benefit of priority from Japanese Patent Application Nos., 2000-098254, filed Mar. 31, 2000, and 2001-073572, filed Mar. 15, 2001. The entire contents of those domestic and foreign applications are incorporated herein by reference.

BACKGROUND OF THE INVENTION

1. Field of the Invention

The present invention relates to a terminal electrode forming method for a chip-style electronic component and an apparatus therefor, and more particularly to a terminal electrode forming method for a chip-style electronic component and an apparatus therefor, capable of adapting to miniaturization of the chip-style electronic component, improving the quality of the terminal electrode and adaptable to mass production by executing conductive paste coating etc. while holding the chip-style electronic component by a film coated with an adhesive material.

2. Related Background Art

In general, the terminal electrode formation in a chip-style electronic component means forming a connecting electrode at an end of the chip-style electronic component by coating, drying and sintering paste containing silver, silver-palladium, copper etc. on such end portion, for the purpose of connection with an internal conductor or an internal electrode of the chip-style electronic component. The present invention describes a method for forming a terminal electrode on both ends of a chip-style electronic component such as a ceramic capacitor or a noise filter.

In the conventional terminal electrode forming method for the chip-style electronic component, the chip-style electronic components are held, as shown in FIG. 11, by forming holding holes 51 in silicone rubber 60 and inserting the chip-style electronic components 1, aligned by an insertion guide plate 52, into the holes 51 with inserting pins 53. Such holding method for the chip-style electronic components is however associated with the following drawbacks.

FIGS. 12 and 13 show a state in which the chip-style electronic components 1, inserted and held in the holding holes 51 shown in FIG. 11, are positioned downwards for conductive paste coating, and, in such state, the chip-style electronic components 1 are supported by the elasticity and friction of rubber 50. Thus, at the insertion, the chip-style electronic components are inserted by sliding into the holes 51 of the rubber 50, and, at the holding, they are supported by the elasticity of rubber 50 and the friction of the contact portions. Thus, the chip-style electronic component may not be properly placed at the desired position because sliding and friction, which are mutually contradicting factors, are involved and because of deformation of the rubber 50. Also the mutually contradicting relationship of sliding and friction cannot be controlled because of the minituarization of the chip-style electronic component reduces the contact portion. Also as the holes are formed in the silicone rubber 50, it is necessary to pay attention to the abrasion of the holes 51 and to discard the rubber 50 after certain abrasion.

The feeding mechanism for feeding the chip-style electronic components into the holding holes 51 of silicone rubber 50 is associated with the following drawbacks. For feeding the chip-style electronic components, there is generated employed separation and alignment of the chip-style electronic components by sifting with the insertion guide plate 52 shown in FIG. 11. In this method, as the chip-style electronic components become smaller, the inserting pins 53 also become thinner, thus becoming insufficient in strength and precision. Also the mechanism (jig) becomes inevitably expensive because a high precision is required for the holes of the sifter and those of the holder, and also for the relative positional alignment thereof. In particular, such alignment work is extremely difficult.

Also the conveying mechanism for conveying the chip-style electronic components is associated with the following drawbacks.

The chip-style electronic components having been separated and aligned by the feeding mechanism are held and conveyed by the holes 51 of the silicone rubber 50 formed in the form of a plate or a belt. A plate-shaped holder is conveyed between the process steps either manually or by a robot arm. Manual conveying requires a high labor cost, while robot conveying requires a large and expensive equipment. Also a belt-shaped holder can reduce the labor cost and the floor space required for the equipment, but requires a highly precise conveying mechanism, which inevitably becomes complex and expensive because the alignment is difficult.

Furthermore, the coating surface of the chip-style electronic component has the following difficulties.

Prior to the coating with the conductive paste, the coating faces of the chip-style electronic components have to be aligned with a high precision. Without such alignment work, the dimension B, shown in FIG. 10, of a terminal electrode 2 formed on both ends of the chip-style electronic component 1, namely the length of the electrode in the longitudinal direction of the component, shows a significant fluctuation, and the terminal electrode may not be formed in the worst case.

On the other hand, the plate-shaped holder is suitable for mass production because of the large area thereof, but it is difficult to ensure planarity. Also the belt-shaped holder is formed with a smaller area for a smaller size of production, but it is also difficult to ensure the position because of the reasons explained in relation to the holding method.

Furthermore, the coating mechanism for the conductive paste is associated with the following difficulties.

A coating mechanism shown in FIG. 14A is to form a uniform conductive paste layer 52 on a flat surface a coating bed 60 by means of a squeegee 61, while a coating mechanism shown in FIG. 14B is to form a uniform conductive paste layer 62, by a squeegee 61, on the peripheral surface of a coating roller 66 which is immersed in a lower part thereof in a conductive paste reservoir 65. The terminal electrodes are formed by immersing the end portions of the supported chip-style electronic components in the uniform conductive paste layer 62 formed on such flat surface or on such peripheral surface of the roller.

In case of the plate-shaped holder, the end portions are immersed in the paste layer formed on a flat surface as shown in FIG. 14A. A large area is employed in this method because mass production is intended, and it is difficult to ensure the planarity in such large area.

Also in case of the belt-shaped holder, there is generally employed the coating roller mechanism shown in FIG. 14B, but it is difficult to ensure the precision of the center of the roller and the straightness of the cylindrical surface constituting the roller. Also there is required a high precise parallel relationship between the paste layer and the chip-style electronic components.

Furthermore, the following difficulties are involved in the drying the conductive paste applied on the chip-style electronic components.

The drying of the conductive paste is achieved in an oven using a heater of the electric resistance type, by radiated heat and atmospheric temperature (convection). In order to complete drying by evaporating solvent contained in the paste constituting the terminal electrode, there is required a long time under a high temperature (for example 60 seconds at 180° C.). In order to withstand such high temperature, the conveying mechanism has to be given a heat-resistant property (for example metal belt or heat-resistant conveyor). Consequently the design of the conveying system is limited, and such system inevitably involves complex mechanisms and control with a high cost. Also there is required a large floor space for the equipment. Furthermore, even in case the heat-resistant arrangements are adopted, there still result a change in the conveying position resulting from the thermal dilatation.

Furthermore, a reversing operation executed for forming the terminal electrodes on both ends of the chip-style electronic component is associated with the following difficulties.

In order to form the terminal electrodes on both ends of the chip-style electronic components, it is necessary to position the chip-style electronic components, inserted into the holes 51 of the silicone rubber 50, by pushing them out to the opposite side with the inserting pins 53. In this operation, it is difficult to ensure exact positioning and secure operation because of the reasons explained in relation to the holding method.

Furthermore, the discharging of the chip-style electronic components after the formation of the terminal electrodes, is associated with the following difficulties.

The chip-style electronic components after the formation of the terminal electrodes are finally pushed out from the holes of the silicone rubber for example into a receiving box, but, for this purpose, there is again required a complex mechanism for secure discharge.

Thus, the drawbacks in the conventional terminal electrode forming method can be listed as follows:

1) The terminal electrodes cannot be formed precisely and stably on miniaturized chip-style electronic component;
2) Replacement of the kind of the chip-style electronic components to be processed is time-consuming;
3) There are required high costs for the equipment, consumables and replacement parts;
4) The electrode dimension fluctuates significantly since secure positioning (holding) is not achieved at the electrode forming operation;
5) The relative positional (parallel) relationship between the conductive paste layer and the chip holder is unstable, resulting in a fluctuation in the dimensional precision of the electrode;
6) In the conveying operation in the drying oven, the conveying mechanism exhibits dimensional change and a loss in the holding ability because of the heat; and
7) The long drying time requires a long drying oven, leading to a larger equipment.

SUMMARY OF THE INVENTION

In consideration of the foregoing, a first object of the present invention is to provide a terminal electrode forming method for a chip-style electronic component and an apparatus therefor, capable of adapted to the miniaturization of the chip-style electronic component and improving the quality of the terminal electrode.

A second object of the present invention is to provide a terminal electrode forming method for a chip-style electronic component and an apparatus therefor, capable of reducing the manufacturing cost of the component by simplifying the manufacturing apparatus and reducing the cost thereof, and also enabling mass production of the components of many kinds, by significantly reducing the preparation time required for changing the kind.

The above-mentioned objects can be attained, according to the present invention, by a terminal electrode forming method for a chip-style electronic component, comprising:

an arraying step of arraying chip-style electronic components on an arraying flat bed thereby achieving positioning of the chip-style electronic components and aligning the faces thereof;

an adhering step of lowering a first film coated with an adhesive material, together with an adhering top plate parallel to the arraying flat bed, in relative manner thereby adhering ends of the positioned and aligned chip-style electronic components to the adhesive; and a coating step of lowering the aforementioned first film on which the chip-style electronic components are adhered together with a coating top plate relative to and parallel to a coating flat bed provided thereon with a conductive paste layer of a constant thickness thereby pressing the other ends of the chip-style electronic components to the coating flat bed.

The above-mentioned terminal electrode forming method for the chip-style electronic component may further comprises:

a drying step of drying the conductive paste coated on the other ends of the chip-style electronic components in the coating step; and a reversing step of positioning, on a reversing bed, a second film coated with an adhesive material, lowering the aforementioned first film holding the chip-style electronic components after the drying step, together with a reversing top plate, in relative manner thereby adhering the ends, coated with the conductive paste, of the chip-style electronic components to the adhesive of the second film, then peeling off the first film together with the adhesive material thereof, and reversing the second film holding the chip-style electronic components.

There is preferably adopted a configuration in which the aforementioned film is formed as a tape, which is fed from a roll and wound on another roll to convey the chip-style electronic components supported by the adhesive material.

The aforementioned drying step is preferably achieved by concentrating far-infrared light to the portions, coated with the conductive paste, of the chip-style electronic components.

There is preferably adopted a configuration in which the aforementioned adhesive is a thermal foaming-release adhesive and the first film and the adhesive thereof are peeled off from the chip-style electronic components supported by the second by heating of the first film.

According to the present invention, there is also provided a terminal electrode forming apparatus for a chip-style electronic component, comprising:

a first tape running mechanism to run a first adhesive tape coated with an adhesive on a surface thereof;

a second tape running mechanism to run a second adhesive tape coated with an adhesive on a surface thereof;

an electronic component supplying unit to adhere ends of a group of chip-style electronic components in an arrayed state, on a surface, coated with the adhesive, of the first adhesive tape;

a first paste applying unit for applying conductive paste by pressing the other ends of a group of the chip-style electronic components, conveyed by running of the first adhesive tape, to a coating flat bed;

a first drying unit for drying the conductive paste applied on the other ends of a group of the chip-style electronic components;

a transfer unit for transferring a group of the chip-style electronic components, after passing the drying unit, from the first adhesive tape to the second adhesive tape thereby causing the second adhesisve tape to support the end, coated with the conducted paste, of the chip-style electronic components;

a second paste applying unit for applying conductive paste by pressing the ends, not coated with the conductive paste, of a group of the chip-style electronic components, conveyed by running of the second adhesive tape, to a coating flat bed;

a second drying unit for drying the conductive paste applied on the ends of the chip-style electronic components; and a discharge unit for peeling a group of the chip-style electronic components from the second adhesive tape.

In the aforementioned terminal electrode forming apparatus for the chip-style electronic component, the electronic component supply unit, the first paste applying unit and the first drying unit provided along the running path of the first adhesive tape and the second paste applying unit and the second drying unit provided along the running path of the second adhesive tape are preferably provided in a substantially same vertical plane and in two steps of different heights.

It is further preferred that the first adhesive tape receives adhesion of the chip-style electronic components supplied by the electronic component supply unit in a state where the surface coated with the adhesive is positioned downwards and transfers the chip-style electronic components to the first paste coating unit and the firstt drying unit in a state supporting the chip-style electronic components at the lower side, and that the second adhesive tape receives adhesion of the chip-style electronic components in the transfer unit in a state where the surface coated with the adhesive positioned downwards and transfers the chip-style electronic components to the second paste coating unit and the second drying unit in a state supporting the chip-style electronic components in a state supporting the chip-style electronic components at the lower side of the second adhesive tape.

It is preferred that the adhesives applied on the first and second adhesive tapes are thermal foaming-release adhesives and that the forming temperature is higher in the second adhesive tape than in the first adhesive tape.

The electronic component supply unit is preferably provided with an arraying block having a plurality of through holes for housing the chip-style electronic components and capable of arraying the chip-style electronic components in a standing state, a reference block having a flat surface for contacting the lower surface of the arraying block thereby aligning the lower end positions of the chip-style electronic components, and a dropper for dropping the chip-style electronic components into the through holes.

Furthermore, in dropping the chip-style electronic components into the through holes by the dropper, there is preferably provided a gap between the lower surface of the arraying block and the reference block in such a manner that the upper ends of the chip-style electronic components do not protrude from the upper surface of the arraying block.

The first and second tape running mechanisms are preferably provided with vacuum suction rollers for respectively driving the first and second adhesive tapes.

It is also preferred that each of the first and second paste applying units forms, on the coating flat bed, a conductive paste layer for dipping and a conductive paste layer for blotting or a conductive paste uncoated surface and is adapted to execute a first operation of dipping end of a group of the chip-style electronic components into the conductive paste layer for dipping and a second operation of contacting such ends with the conductive paste layer for blotting or the conductive paste uncoated surface thereby returning the excessive conductive paste to the coating flat bed by blotting.

It is also preferred that the transfer unit positions the first adhesive tape at the lower side with the adhesive coated surface thereof on which the chip-style electronic components are adhered upwards and also positions the second adhesive tape at the upper side with the adhesive coated surface thereof downwards, thereby supporting the chip-style electronic components between the first and second adhesive tapes positioned in parallel manner, and that the chip-style electronic components are supported by the second adhesive tape by dissipating the adhesive property of the first adhesive tape.

It is furthermore preferred that the running direction of the first adhesive tape from the electronic component supply unit to the first paste applying unit and the first drying unit and the running direction of the second adhesive tape from the transfer unit to the second paste applying unit and the second drying unit are mutually opposite.

The present invention is featured by a fact that the chip-style electronic components are held by the adhesive material, and this feature will be explained further in the following.

In holding the chip-style electronic components, it is important not to perturb the posture thereof.

Conventionally, in order not to perturb the posture of the held chip-style electronic components, the holding is achieved by insertion into rubber holes or by mechanical chucking, so as to withstand the vibrations resulting from the conveying operation or the operations of process steps and the external perturbation (external force) caused by impact. It is in fact possible to prevent change in the posture by pressing from left and right and from front and back so as to withstand the external perturbation.

However, with the progress in the miniaturization of the chip-style electronic components, it is found that the holding executed for the purpose of preventing the external perturbation may become a cause of generating an external perturbation in establishing the precision. For example, the chip-style electronic component inserted into the rubber hole with a perturbed posture is coated obliquely when subjected to coating without correction of the posture, or a deficient dimension of the electrode is found because the chip-style electronic component once positioned moves again by the elasticity of rubber.

In the present invention, an entirely different approach is made to the aforementioned issue and any holding is eliminated. Such approach eliminates all the factors limiting the increase of precision and allows to realize highly precise positioning.

Such approach consists of a method of only adhering an end portion (end face) of the chip-style electronic component and not employing any other holding means. The chip-style electronic component adhered by the adhesive has to withstand impacts such as vibrations in the conveying operation, but complex mechanisms can be dispensed with if such impacts or vibrations can be withstood. In the miniaturized chip-style electronic component, with its small mass, the moment generated by the abrupt acceleration or impact is limited and does not exceed the adhesive force.

The adhesive material supporting the chip-style electronic component functions as a cushioning material therefor when a vibration is applied as an external perturbation.

The adhering method provides following functions:

holding the chip-style electronic component;

absorbing the fluctuation in the external dimension of the chip-style electronic component;

absorbing an abnormal shape in the chip-style electronic component;

memorizing the shape of the absorbed fluctuation or abnormal shape; and peelability of the chip-style electronic component.

The adhesive material, showing jelly-like property, changes its shape under the application of an excessive displacement, and can maintain such changed shape though the recovery of the shape occurs by several percent by elasticity. Thus the chip-style electronic component can be held and conveyed, maintaining the posture at the attaching by adhesion. Therefore, if the attaching (feeding of the component) is executed with a highly precise positioning, such precision can be maintained thereafter.

Such holding method is applicable not only to a chip-style electronic component with a single terminal at the terminal electrode but also to a chip-style electronic component with plural terminals at the terminal electrode.

Other objects of the present invention, and the features thereof, will become fully apparent from the following detailed description of the embodiments.

BRIEF DESCRIPTION OF THE DRAWINGS

FIGS. 20A and 20B are respectively an elevation view and a lateral cross-sectional view of a drive roller in an embodiment of the apparatus;

FIG. 21 is a view showing a torque control system for a feeding roll in an embodiment of the apparatus;

FIGS. 24A, 24B, 24C and 24D are views showing principal parts of the arraying cartridge;

DETAILED DESCRIPTION OF THE PREFERRED EMBODIMENTS

The present invention will be clarified in detail by embodiments of the terminal electrode forming method for the chip-style electronic component and the apparatus therefor, with reference to the accompanying drawings.

At first there will be explained an embodiment of the terminal electrode forming method of the present invention for the chip-style electronic component, with reference to FIGS. 1 to 9.

Figure 1:
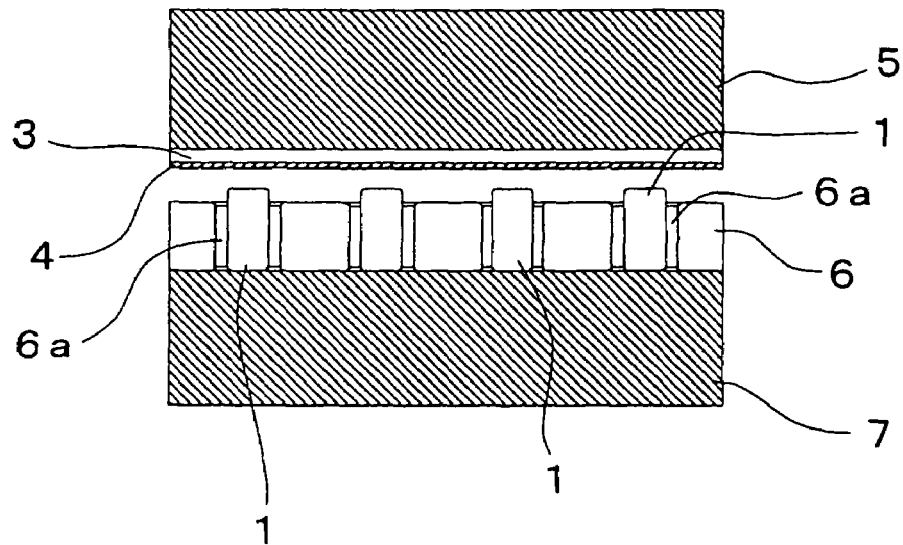
FIG. 1 is a cross-sectional view of a feeding mechanism for a chip-style electronic component, representing an embodiment of the terminal electrode forming method of the present invention for the chip-style electronic component.
Figure 2:
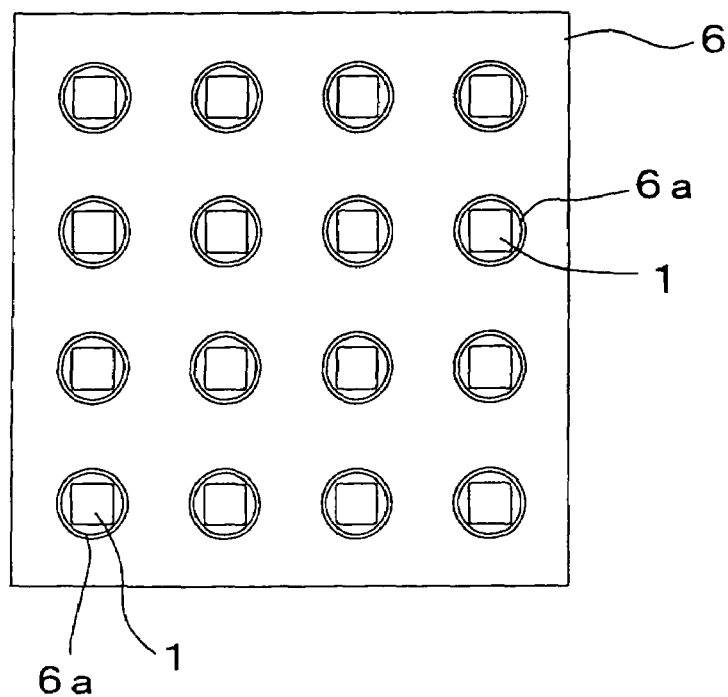
FIG. 2 is a plan view of the feeding mechanism.

FIGS. 1 and 2 show a supply mechanism for the chip-style electronic components. This mechanism arrays the chip-style electronic components on an arraying flat bed 7 utilizing a guide plate 6, thereby achieving an arraying step including positioning of the chip-style electronic components and aligning (aligning the height of the lower ends) therefor.

Figure 3:
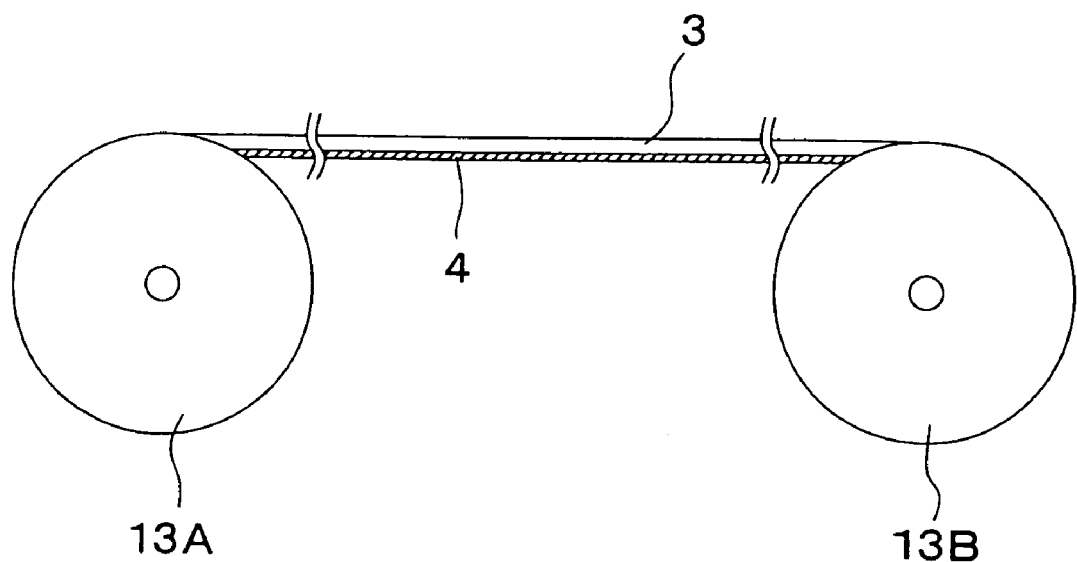
FIG. 3 is a schematic view showing a conveying mechanism in an embodiment.

FIG. 3 shows a PET film 3 of a tape shape coated with a thermal foaming-release (thermally releasable) adhesive 4. As shown in FIG. 1, the PET film 3 coated with the adhesive 4 is lowered together with an adhering top plate 5 parallel to the arraying flat bed 7 in relative manner (namely a descent of the top plate 5 or an ascent of the bed 7) to execute an adhering step of adhering ends of the chip-style electronic components, already subjected to positioning and alignment, to the adhesive 4. The thermal foaming-release adhesive is also called a thermally releasable adhesive, and exhibits a normal adhering force at the normal temperature but loses the adhering force by the foaming in the adhesive and by the resulting decrease of the adhering area upon being heated to a predetermined temperature or higher whereby the adhered article can be peeled off.

In the supply mechanism shown in FIGS. 1 and 2, the positioning of the components at the supply thereof is important in attaching the chip-style electronic components 1 on the adhesive 4 of the film 3. At first, on a bed 7 having a highly precise flat surface of a minimum necessary area for facilitating the mechanical working, a guide plate 6 is placed and, into vertical holes 6a formed therein, the chip-style electronic components 1 are vertically dropped. In this operation, the holes 6a have to be of such a size that the posture of the chip-style electronic components 1 can be spontaneously corrected (with a certain play). The chip-style electronic components 1 are thus arrayed according to the planarity of the highly precise flat bed 7. In this state the PET film 3 coated with the adhesive 4 is lowered, from above the chip-style electronic components, together with the top plate 5 in a highly precisely parallel state, whereby the chip-style electronic components are held by the adhesive 4 in a state of highly precise positioning.

Figure 4:
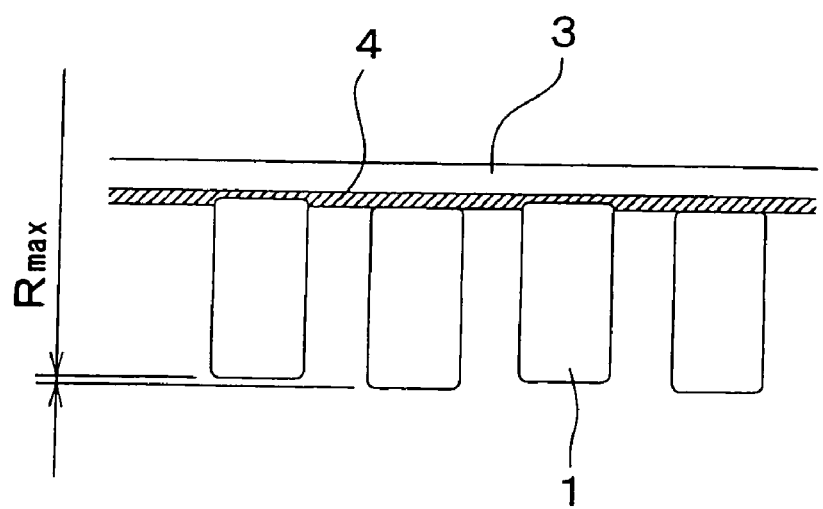
FIG. 4 is a schematic view showing absorption of the fluctuation of the chip-style electronic components in the embodiment.
Figure 5:
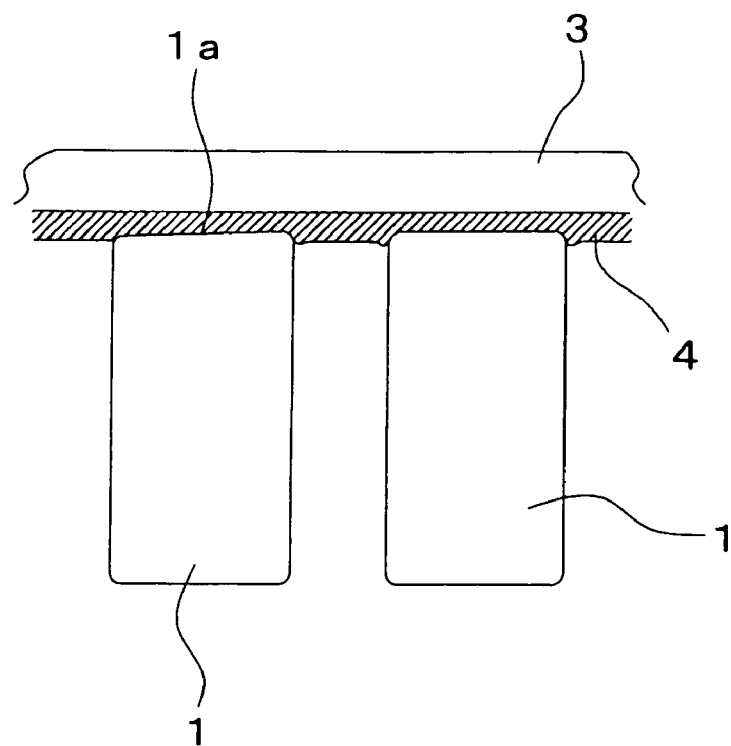
FIG. 5 is a schematic view showing absorption of the abnormal shape in the chip-style electronic components in the embodiment.

As explained in the foregoing, the adhesive 4, showing jelly-like property, changes its shape under application of a displacement exceeding a certain limit, and such changed shape can be approximately maintained except for an elastic recovery by several percent. Therefore, the adhesive 4 is capable, in addition to the holding of the chip-style electronic components 1, of absorbing the fluctuation in the external dimension thereof, absorbing the abnormal shape therein, and memorizing the shape of thus absorbed fluctuation or abnormal shape. For example, as shown in FIG. 4, in a state where the chip-style electronic components 1 are held by the adhesive 4 of the film 3, even if there is variation in length of the chip-style electronic components 1, the coating faces thereof can be controlled within a range (Rmax in FIG. 4) of 10 μm by the change in the shape of the adhesive 4 and the changed shape memorizing function thereof. Also in case the end portions in a part of the chip-style electronic components 1 have an abnormal shape as shown in FIG. 5 (an inclined top end face), the adhesive 4 becomes recessed according to such abnormal shape 1a thereby absorbing the fluctuation resulting from such abnormal shape.

The chip-style electronic components 1 attached to the tape 3 are held in the posture at the attachment and are conveyed to a next step (coating step). The conveying mechanism can be simplified by coating the adhesive 4 on the PET film 3 in the form of a tape, forming such film 3 as a roll, feeding the film 3 from a film roll 13A and winding it on a film roll 13B as shown in FIG. 3.

Figure 6:
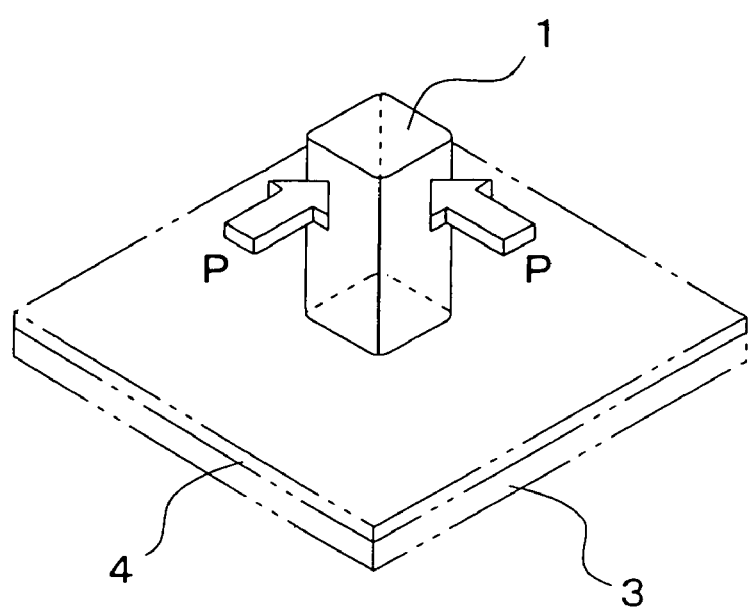
FIG. 6 is a perspective view showing the adhesion and holdiong of the chip-style electronic components in the embodiment.

As the chip-style electronic components 1 are attached to the film 3 in a closely gathered state, there can be processed several tens to several hundreds of the components at a time. Also by such close gathering, any external perturbation perturbing the posture of the chip-style electronic component 1, as indicated by arrows P in FIG. 6, is dispersed among all the chip-style electronic components so that the perturbation of the posture can be effectively prevented.

Figure 7:
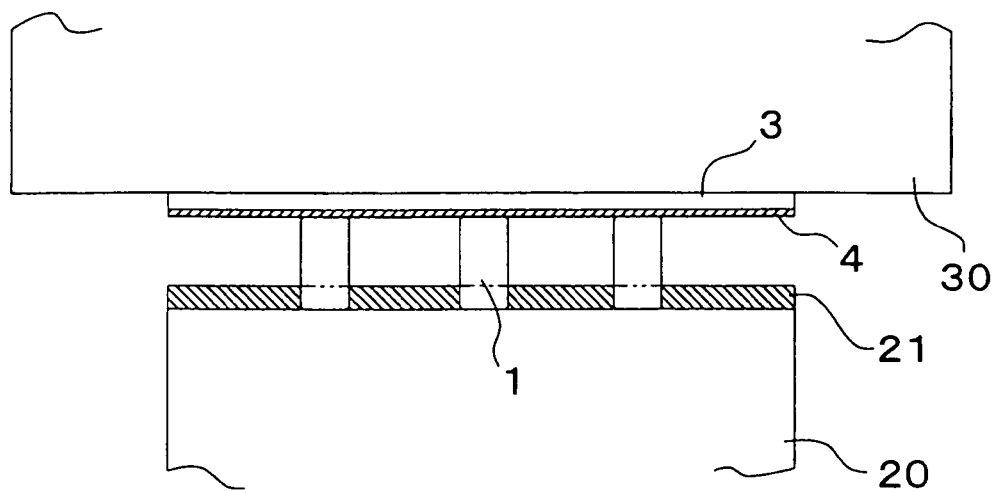
FIG. 7 is a cross-sectional view of a coating mechanism in an embodiment.

FIG. 7 shows a coating mechanism for executing a coating step for applying conductive paste on the ends of the chip-style electronic components, wherein shown are a coating flat bed 20, and a coating top plate 30 parallel thereto. On the coating flat bed 20 there is provided in advance a conductive paste layer 21 of a constant thickness, by an unrepresented squeegee. The film 3 on which the chip-style electronic components 1 are adhered is lowered together with the coating top plate 30 parallel to the coating flat bed 20 in relative manner (namely by a descent of the top plate 30 or by an ascent of the bed 20), whereby the ends of the chip-style electronic components 1 are pressed to the coating flat bed 20 and immersed in the conductive paste layer 21.

In order to maintain precision in forming the conductive paste layer 21, the area of the bed 20 has to be made as small as possible. By pressing the chip-style electronic components 1 to the bed 20 of such highly precise flatness, it is rendered possible to absorb the elasticity of the adhesive of several micrometers and to form the electrodes of high precision.

Figure 8:
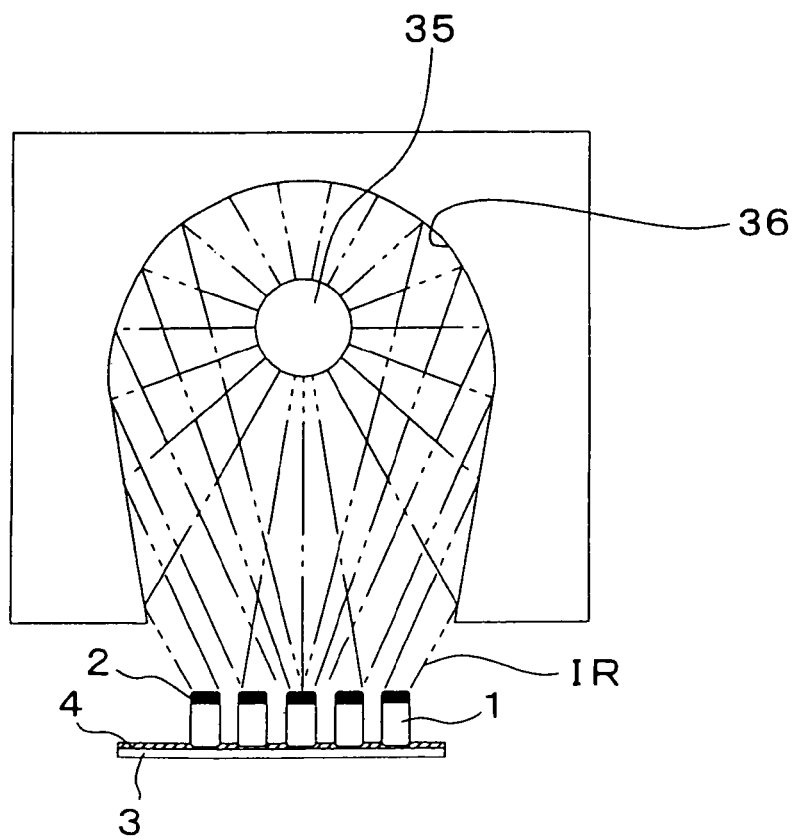
FIG. 8 is a cross-sectional view of a far-infrared drying mechanism in an embodiment.

After the application of the conductive paste to constitute terminal electrodes 2 on ends of the chip-style electronic components in the coating step, the components are supplied into a drying mechanism shown in FIG. 8 by the conveying of the film 3, whereupon a drying step is executed. The drying mechanism is provided with a halogen lamp 35, a light condensing face 36 and a special filter (not shown) for generating far-infrared light.

In the drying step, there is conventionally employed drying by electric resistance heating. Such drying is achieved by heat conduction based on convection, by forming an oven structure and elevating the temperature of the internal atmosphere. Such heating method requires a long time until the completion of drying, thus inevitably extending the length of the drying oven and expanding the magnitude of the equipment. Also the drying oven requires a heavy heat insulating mechanism, in order to maintain the temperature of the internal atmosphere.

On the other hand, the drying mechanism of the present embodiment employs drying with far infrared light, utilizing the light emitted from the halogen lamp 35 instead of heating with an electrical resistor. The light emitted from the halogen lamp 35 is transmitted by a special filter, thereby being converted into far infrared light IR.

The wavelength of the far-infrared light is principall 3 μm or longer. Since the solvent employed in the conductive paste absorbs the light of a wavelength region of 3 to 6 μm, the paste layer can be heated from the interior within a short time. Also metals do not absorb but reflect such far-infrared light. Utilizing such property, the condensing face 36 composed for example of a metal is used to reflect the emitted light, thereby simplifying the configuration of the oven and to condense the reflected light thereby controlling the energy and concentrating the far-infrared light of a large amount to the portions of the chip-style electronic components coated with the conductive paste.

These factors allow to realize simplification, cost reduction and space saving of the drying mechanism.

Figure 9:
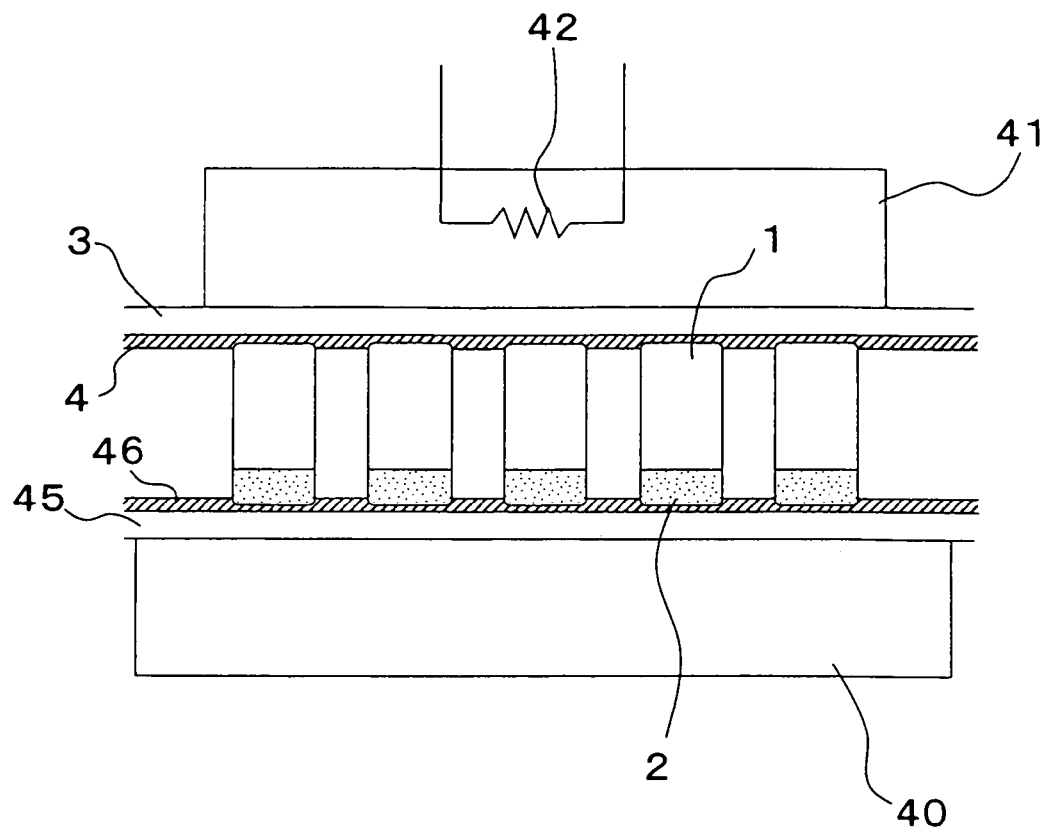
FIG. 9 is a cross-sectional view showing a reversing mechanism in an embodiment.

After the drying step dries the conductive paste coated on the ends of the chip-style electronic components, they are supplied, by the conveying of the film 3, to a reversing mechanism shown in FIG. 9, which executes a reversing step of reversing the direction of the chip-style electronic components 1 by 180°.

The reversing mechanism is provided with a reversing flat bed 40 and a reversing top plate 41 parallel thereto. On the reversing bed 40, there is provided a PET film 45 (second film) coated with thermal foaming-release adhesive 46, and the film 3 (first film) holding the chip-style electronic components 1 having been subjected to the drying step is lowered together with the reversing top plate 41 in relative manner (namely by a descent of the top plate 41 or by an ascent of the bed 40) thereby attaching, to the adhesive 46 of the film 45, the ends coated with the conductive paste (to constitute the terminal electrodes 2) of the chip-style electronic components 1. Then a releasing heater 42 heats the top plate 41 at the side of the film 3 to cause foaming of the adhesive 4 of the first film thereby lowering the adhesive force and releasing the adhesive 4. Thereafter the film 45 holding the chip-style electronic components 1 is reversed by 180°.

As explained in the foregoing, the PET film 45 coated with the adhesive 46 is adhered to those ends of the chip-style electronic components 1 on which electrodes have already been formed and the adhesive 4 utilized in the preceding step is heated. Then, the adhesive 4, consisting of the thermal foaming-release adhesive, loses the adhesive force by heating only, and the chip-style electronic components can be easily transferred to the new adhesive 46. In this operation, the reversing bed 40 and the top plate 41 in the opposed position are required to have highly precise flatness and highly precise parallel positioning.

Instead of the thermal foaming-release adhesives 4, 46, thereby may also be utilized the difference in the adhesive force (or adhesion) in the ordinary adhesives, and, in such case, the latter adhesive 46 is given a higher adhesive force.

The chip-style electronic components 1 held by the film 45 after the reversing are subjected to alignment (aligning the height of the upper ends of the chip-style electronic components 1) by the top plate 41 from which the film 3 has been removed, and are then subjected to steps similar to the coating step and the drying step explained in relation to FIGS. 7 and 8 whereby the terminal electrodes are formed on both ends of the chip-style electronic components 1.

The chip-style electronic components after the formation of the terminal electrodes on both ends are released from the film 45 and are discharged to a receiving box for the chip-style electronic components by a discharge mechanism. The adhesive 46 may be composed of a thermal foaming-release adhesive to achieve such discharge solely by heating, thereby dispensing with a mechanical configuration for the discharge. More specifically, the discharge mechanism can be composed solely of a heat source (far-infrared lamp) for heating the film 45 coated with the adhesive 46 and a receiving box for the discharged chip-style electronic components.

The present embodiment has the following advantages:

(1) It can adapt to the miniaturization of the chip-style electronic components by coating a film with adhesive and holding the chip-style electronic components with the adhesive. Also owing to the property of the adhesive, it can absorb the fluctuation in the external dimension of the chip-style electronic components and the defective shape thereof and can memorize the posture and shape thereof. Also the close gathering of the chip-style electronic components on the film allows to disperse the pressure and to improve the stability of the posture of the chip-style electronic components, thereby enabling mass production and simplification of the attaching and peeling steps.

(2) The chip-style electronic components can be positioned and aligned with a high precision by arraying the chip-style electronic components on the arraying bed 7 having a highly precise flat surface.

(3) By forming the PET film 3 coated with the adhesive 4 into a tape, there can be realilzed a simple conveying configuration including roll feeding and roll winding as shown in FIG. 3 (same being applied to the film 45). Also the conveying configuration utilizing the tape-shaped films coated with the thermal foaming-release adhesives realizes simplification of the feeding of the chip-style electronic components, coating of the terminal electrodes, reversing of the components, drying of the electrodes composed of the coated paste, and the discharge mechanism for the chip-style electronic components.

(4) The shape memorizing property and the jelly-like property of the adhesive coated on the film may be utilized for realizing the absolute position control with reference to the coating surface. More specifically, the adhesive can absorb the fluctuation in the length or the abnormal shape, eventually present in the chip-style electronic components, as shown in FIGS. 4 and 5, whereby the coating faces thereof can be aligned.

(5) The adhesive allows to hold the posture of the chip-style electronic components and to eliminate useless external perturbation, and the gathering of the chip-style electronic components enables to disperse the pressure, whereby a high productivity can be realized.

(6) The coating bed 20 is formed with a smallest possible area to ensure a highly precise flatness, thereby ensuring the dimensional precision of the thickness of the conductive paste layer 21 formed thereon, and the chip-style electronic components are pressed to the bottom of the paste layer, namely to the highly precise bed 20, whereby the alignment of the height of the chip-style electronic components can be realized.

Figure 10:
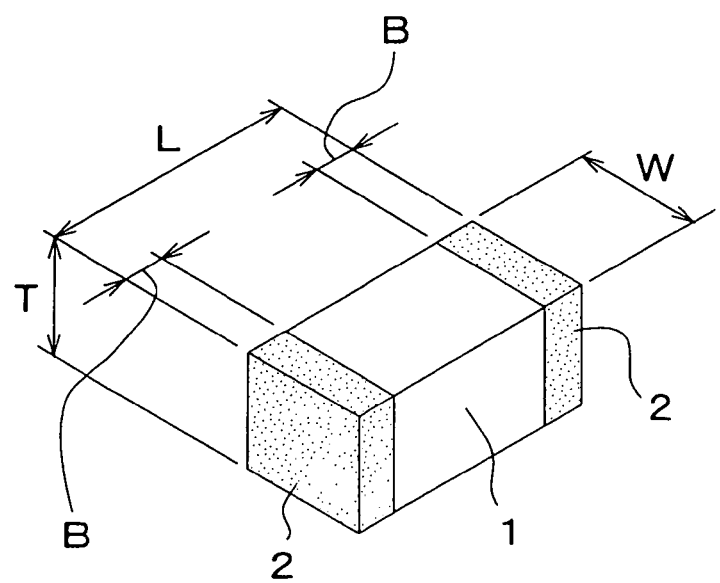
FIG. 10 is a perspective view showing a chip-style electronic component and its terminal electrodes.
Figure 11:
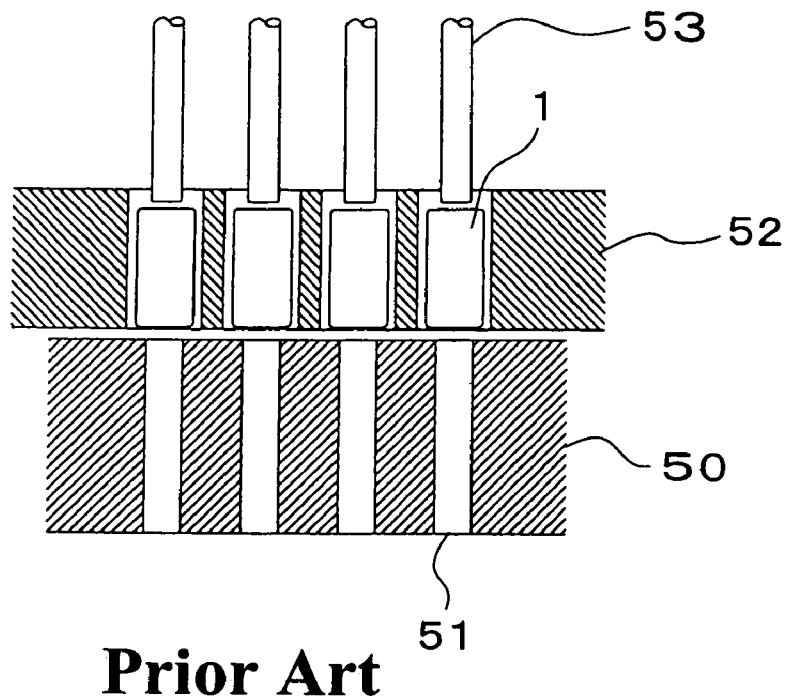
FIG. 11 is a cross-sectional view showing chip supply in a conventional technology.
Figure 12:
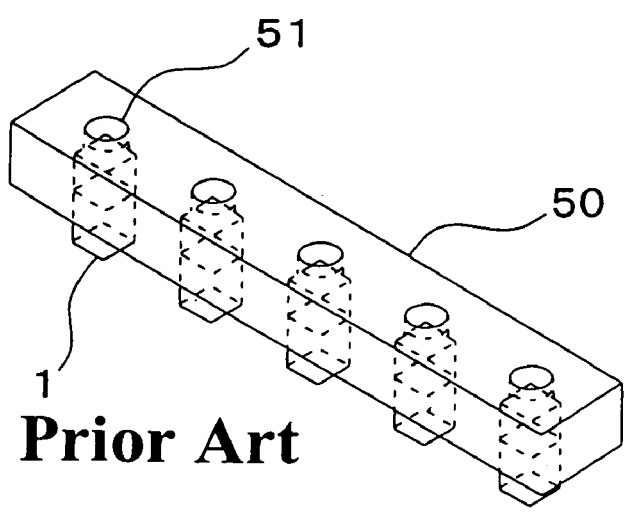
FIG. 12 is a perspective view showing a holding method for the chip-style electronic components in a conventional technology.
Figure 13:
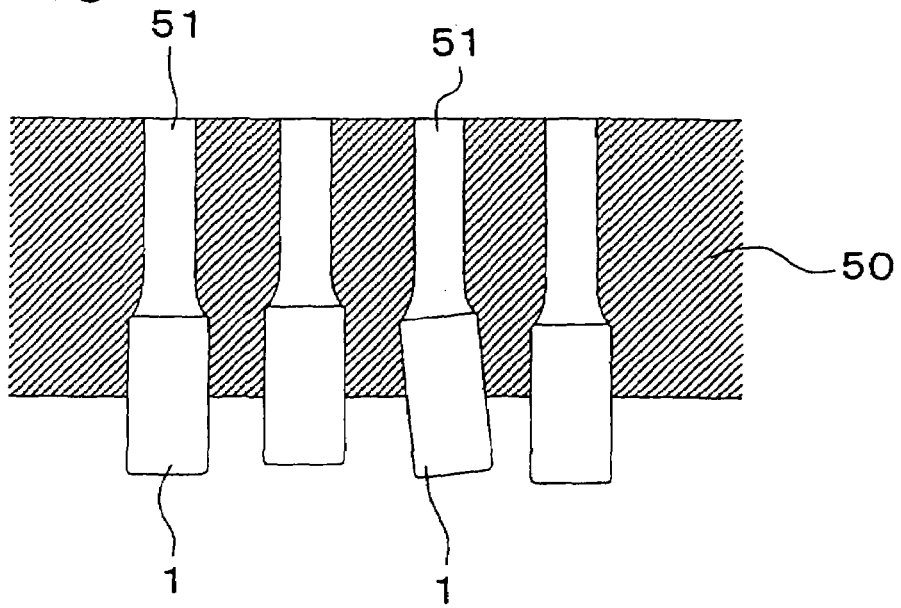
FIG. 13 is a cross-sectional view showing such conventional technology.
Figure 14A:
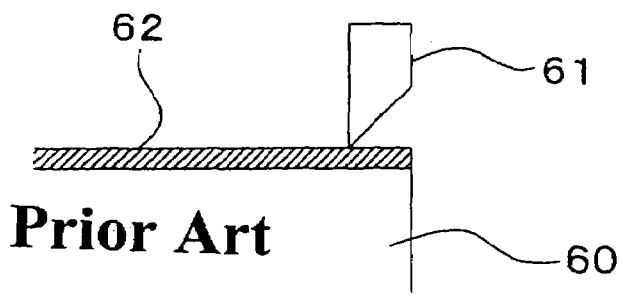
FIGS. 14A and 14B are schematic views showing a coating mechanism in A conventional technology.
Figure 14B:
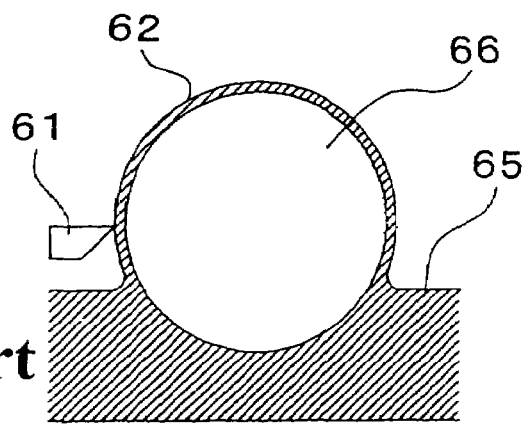
Figure 15:
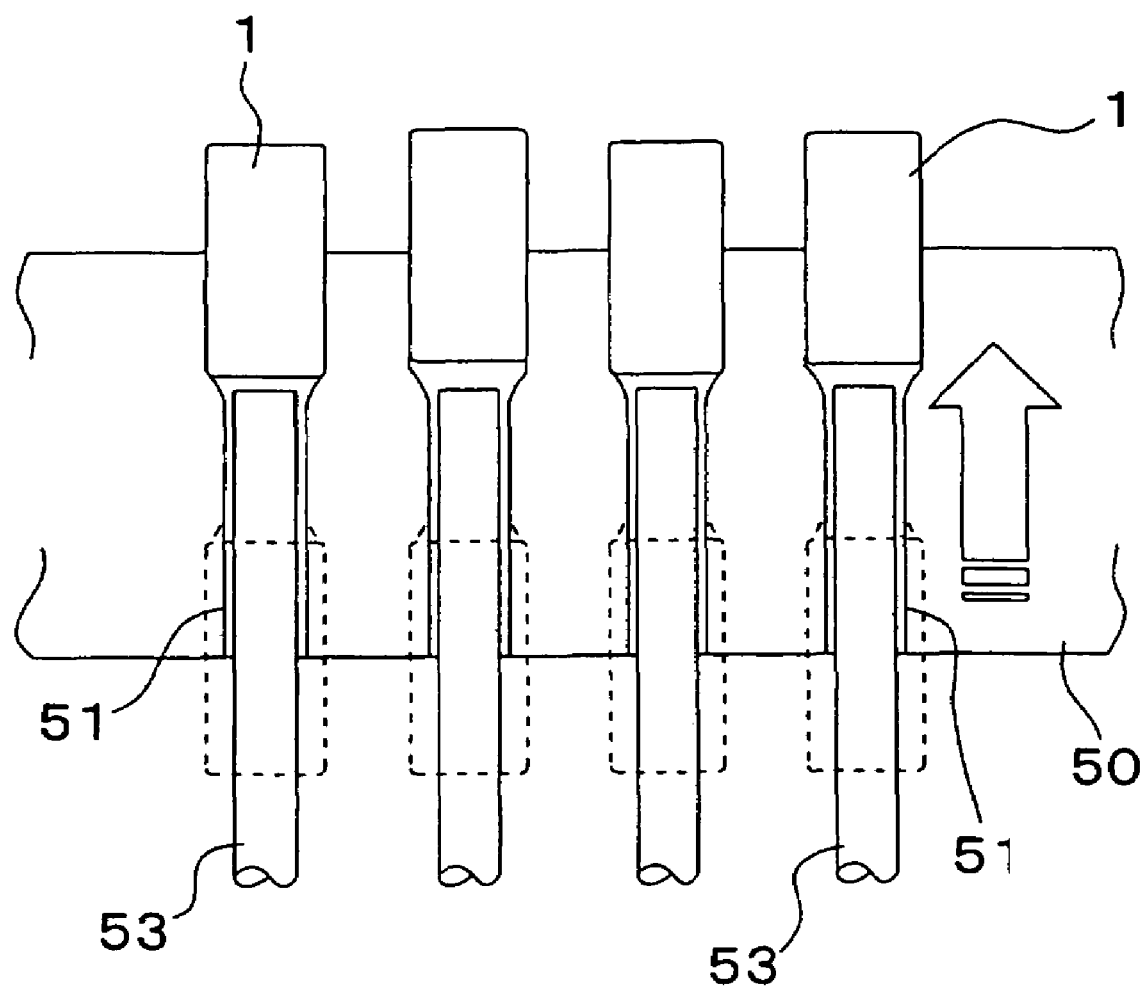
FIG. 15 is a schematic view showing a reversing mechanism in a conventional technology.

(7) The chip-style electronic component 1 shown in FIG. 10 for example has the following dimensions:
chip component 1005: length L: 1 mm, width W: 0.5 mm, thickness T: 0.5 mm;
chip component 0603: length L: 0.6 mm, width W: 0.0.2 mm, thickness T: 0.3 mm;
chip component 0402: length L: 0.4 mm, width W: 0.2 mm, thickness T: 0.2 mm.

The above-described holding and highly precise positioning of the miniaturized chip-style electronic components can maintain, for example, in the chip component 0603, a fluctuation of the position of the coating surface (Rmax in FIG. 4) within a range of 0.01 to 0.005 mm. Also such reduced fluctuation of the position of the coating surface of the chip-style electronic components realizes an improvement in the precision of the electrodes. For example, in the chip component 0603, the precision of the electrodes can be maintained within 0.01 mm (dimension B in FIG. 10). For comparison, in the conventional technology, the dimension B is within 0.02 mm.

(8) In the drying step, the drying time can be shortened by the irradiation with the far-infrared light. Thus, by employing light energy as the heat source and controlling such heat source, it is possible to simplify the drying oven and to improve the controllability.

(9) The reversing mechanism for reversing the chip-style electronic components by 180° for forming the terminal electrodes on both ends of the chip-style electronic component can be realized by a simple mechanism utillizing a mechanism for adhering the PET film 45 coated with the adhesive 46 to the chip-style electronic components held by the thermal foaming-release adhesive 4 of the PET 3, and a peeling mechanism for losing the adhesive force of the thermal foaming-release adhesive 4 with heat thereby peeling the film 3.

(10) The peelability of the thermal foaming-release adhesive 46 may be utilized to realize a simple discharging method.

In the following there will be explained, with reference to FIGS. 16 to 29, an embodiment of the terminal electrode forming apparatus for the chip-style electronic components, for executing the above-described method.

Figure 16:
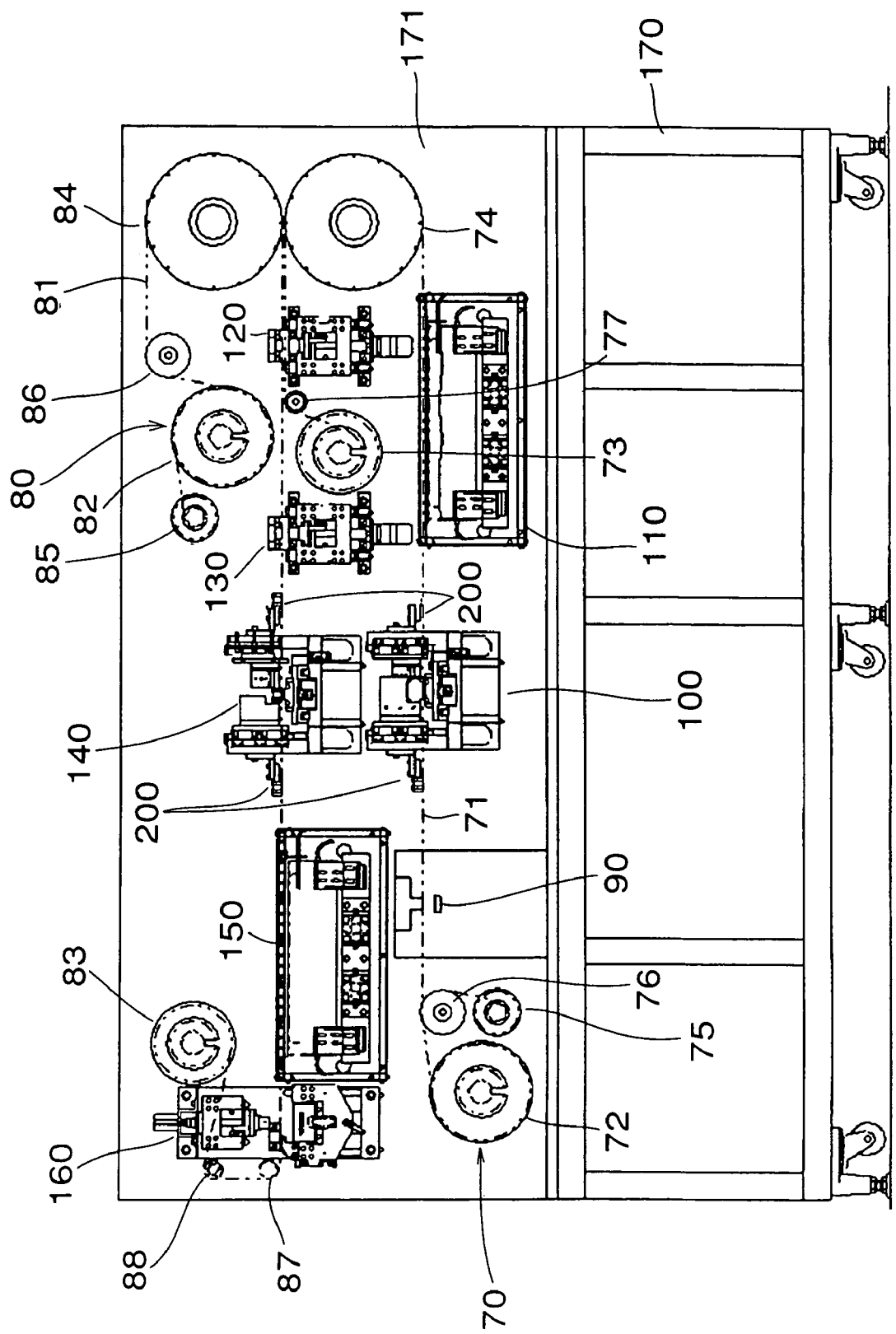
FIG. 16 is an elevation view of an embodiment of the terminal electrode forming apparatus of the present invention for the chip-style electronic components.
Figure 17:
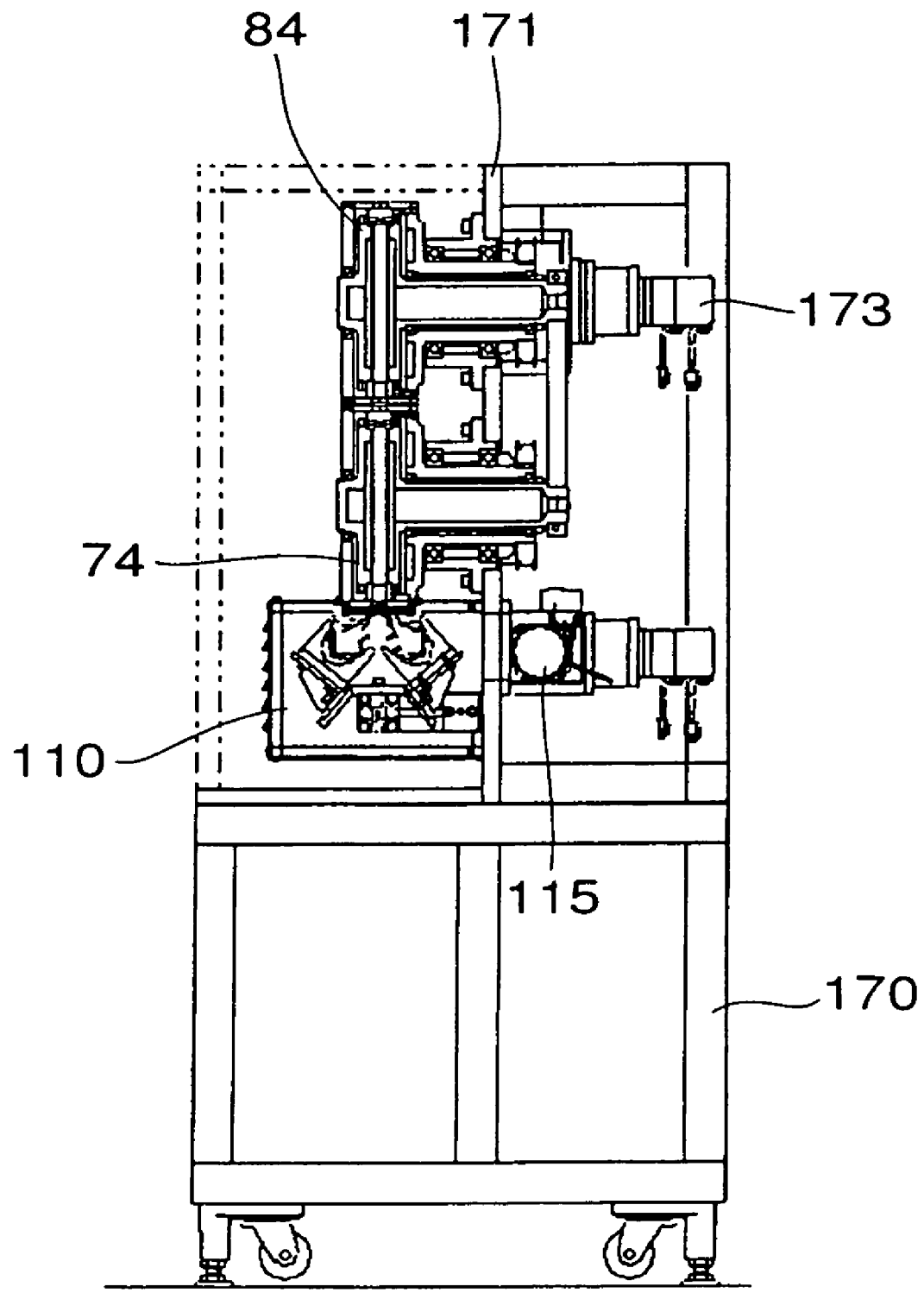
FIG. 17 is a lateral cross-sectional view thereof.
Figure 18:
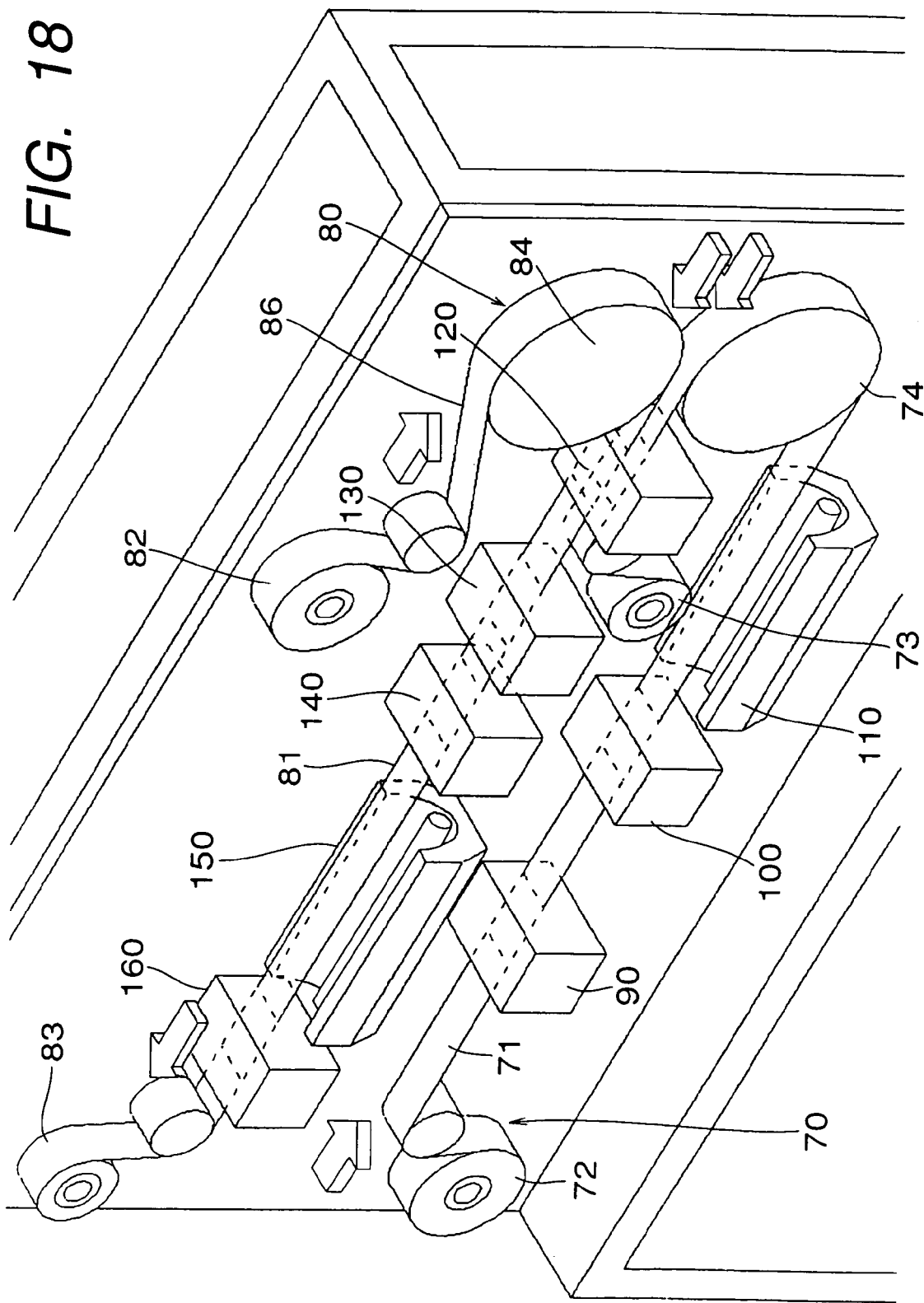
FIG. 18 is a schematic perspective view thereof.
Figure 19:
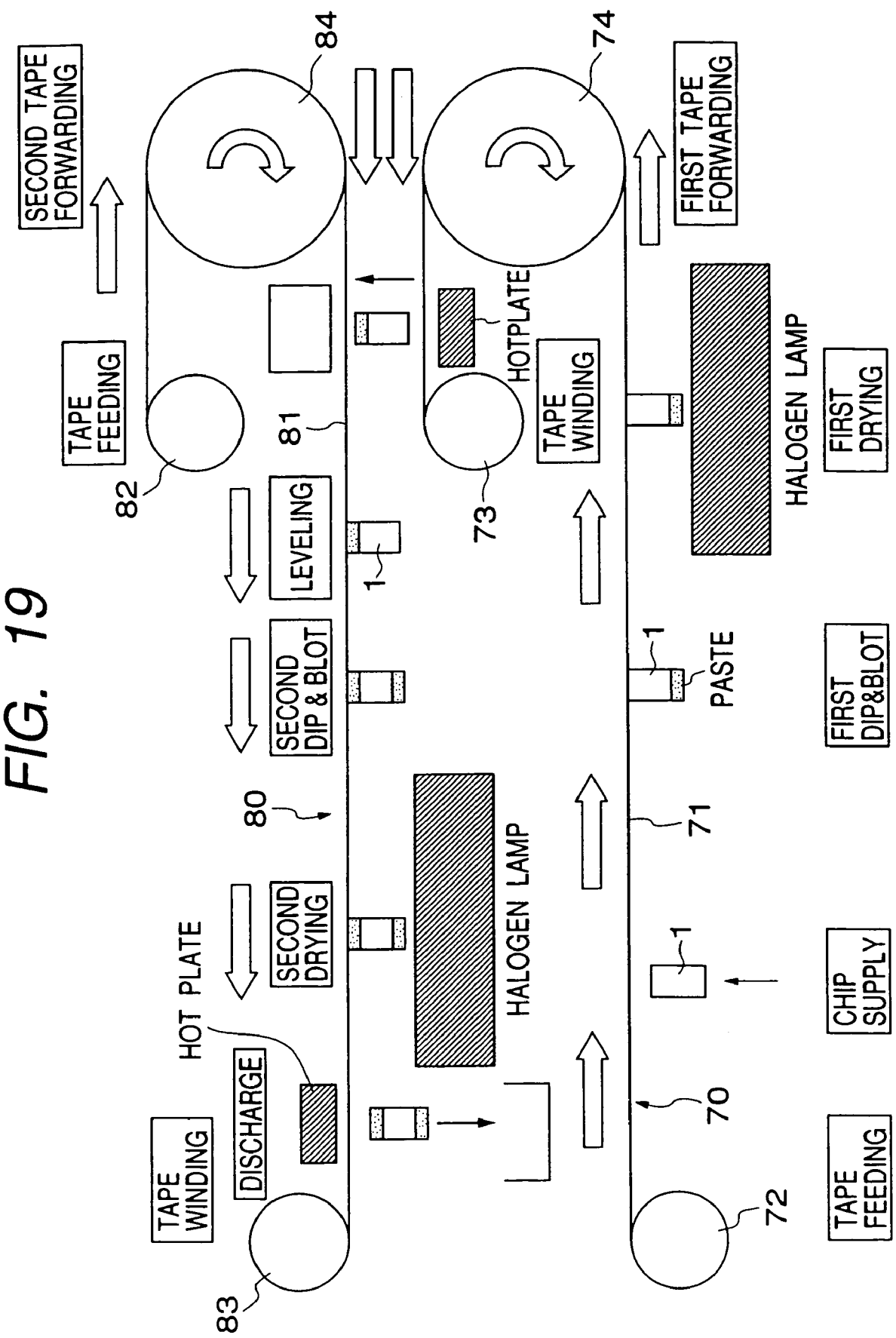
FIG. 19 is a flow chart of the steps in an embodiment of the apparatus.

FIGS. 16 to 18 are respectively an elevation view, a lateral cross-sectional view and a perspective view showing the entire configuration of the terminal electrode forming apparatus for the chip-style electronic components, and FIG. 19 is a view showing the process flow, wherein shown are a first tape running mechanism 70 and a second tape running mechanism 80.

The first tape running mechanism 70, for a first adhesive tape 71 coated with a thermal foaming-release adhesive on a surface thereof, is provided with a feeding roll 72, a winding roll 73, a driving roller 74 and a separator winding roll 75 for winding a separator provided between the layers of the tape. There are also provided guide rollers 76, 77. The drive roller 74 drives the first adhesive tape 74 by a predetermined amount with vacuum suction of an adhesive-free surface of the first adhesive tape 71, which is intermittently forwarded by a predetermined amount by the intermittent rotation of the drive roller 74.

The second tape running mechanism 80, for a second adhesive tape 81 coated with a thermal foaming-release adhesive on a surface thereof, is provided with a feeding roll 82, a winding roll 83, a driving roller 84 and a separator winding roll 85 for winding a separator provided between the layers of the tape. There are also provided guide rollers 86, 87, 88. The drive roller 84 drives the second adhesive tape 84 by a predetermined amount by vacuum suction of an adhesive-free surface of the first adhesive tape 81, which is intermittently forwarded by a predetermined amount by the intermittent rotation of the drive roller 84.

Along the running path of the first adhesive tape 71, there are provided, in succession, an electronic component supply unit 90 for adhering ends of a group of the chip-style electronic components in an arrayed state, to a surface, coated with the adhesive, of the first adhesive tape 71, a first paste coating unit 100 for coating conductive paste by pressing, to a coating flat bed, the other ends of the group of the chip-style electronic components conveyed by the running of the first adhesive tape 71, and a first drying unit 110 for drying the conductive paste coated or applied on the other ends of the group of the chip-style electronic components.

Also along a portion where the first and second adhesive tapes 71, 81 run in parallel, there is provided a transfer unit 120 for transferring the group of the chip-style electronic components, after passing the first drying unit 100, from the first adhesive tape 71 to the second adhesive tape 81 and causing the group of the chip-style electronic components to be held at the ends coated with the conductive paste.

Also for processing the group of the chip-style electronic components transferred in the transfer unit 120 to the second adhesive tape 81, there are provided in succession, along the running path of the second adhesive tape 81, a leveling unit 130 for aligning the lower end positions of the group of the chip-style electronic components, a second paste coating unit 140 for applying conductive paste by pressing, to a coating flat bed, the ends, not coated with the conductive paste, of the group of the chip-style electronic components conveyed by the running of the second adhesive tape, and a second drying unit 150 for drying the conductive paste coated on the ends of the group of the chip-style electronic components, and a discharge unit 160 for peeling the group of the chip-style electronic components from the second adhesive tape 81.

As shown in FIGS. 16 and 17, these mechanisms are assembled to a frame 171 standing on a base 170.

The aforementioned first and second adhesive tapes are formed by coating a surface of a PET film substrate with an adhesive material, and can be composed, for example, of REVALPHA (trade name) of Nitto Denko Corporation. The first adhesive tape 71 can be composed of a one-side coated tape having a foaming temperature of 150° C. and an adhesive force (=adhesive force of adhesive material/tape width) of 3.7 N/20 mm, while the second adhesive tape 71 can be composed of a one-side coated tape having a foaming temperature of 170° C. and an adhesive force of 3.7 N/20 mm. The width of the tapes 71, 81 can be for example 20 mm. The tape width is selected in consideration of the compactization, simplification and precision assurance of the apparatus. For mass production not giving emphasis to the precision of the terminal electrode formation for the chip-style electronic components, a larger tape width may be adopted to significantly increase the processing ability. The tape has a length of 50 meters per reel, thus capable of processing a million units of the chip-style electronic components in a lot. The PET film substrate and the adhesive layer respectively had thicknesses of 100 μm and 45 μm. However the thickness of the adhesive layer is preferably about 10% of the dimension L of the chip-style electronic component shown in FIG. 10.

The first and second adhesive tapes 71, 81 may have a same adhesive force, but, more desirably the first adhesive tape 71 is provided with a weaker adhesive force (for example 2.4 N/20 mm) for achieving secure transfer in the transfer unit 120.

A tape having the adhesive on both surfaces of a PET base substrate may not be adopted because the posture of the chip-style electronic components becomes unstable.

FIGS. 20A and 20B show a first drive roller 74 for driving the first adhesive tape 71 and peripheral mechanisms. As shown in these drawings, the first drive roller 74 is composed of a hollow roller body 180 and a hollow shaft 181 integral therewith, and the interior of these components constitute a vacuum chamber 182. On the periphery of the hollow roller body 180, there are formed a plurality of suction holes 183 communicating with the vacuum chamber 182, and the interior of the vacuum chamber is evacuated by an evacuating system through a discharge path 184 to suck the uncoated surface of the first adhesive tape 71 thereby driving the same. The hollow shaft 181 is rotatably supported by a bearing 172 on the frame 171. A servo motor 713 for rotating the drive roller 74 is mounted on the frame 171, and the drive roller 74 receives the rotary driving force of the servo motor 173 through a pulley 185 fixed to the hollow shaft 181.

A second drive roller 84 for driving the second adhesive tape 81 and peripheral mechanisms are constructed in a similar manner as shown in FIGS. 20A and 20B, and will not, therefore, be explained further.

FIG. 21 shows a mechanism provided around the feed roll 72 for maintaining a constant tension on the first adhesive tape 71. The remaining amount of the tape on the feeding roll 72 is detected by a displacement meter 190 (tape reel diameter being measured on real time basis), and the result of measurement is entered into a controller 191. The controller 191 executes control for maintaining a desired tension regardless of the remaining tape amount, and sends a control signal to an A/D converter 192. The control signal converted into a digital signal by the A/D converter 192 is processed in a processing device 193, then converted back to an analog signal by a D/A converter 194 and is used, through a torque controller 195 for gradually increasing or decreasing the torque of a tension generating motor 196, whereby a desired constant tension is generated on the first adhesive tape 71 fed from the feed roll 72 which is fixed to the rotary shaft of the motor 196.

The second adhesive tape 72 is also maintained at a constant tension by a similar mechanism.

Figure 22:
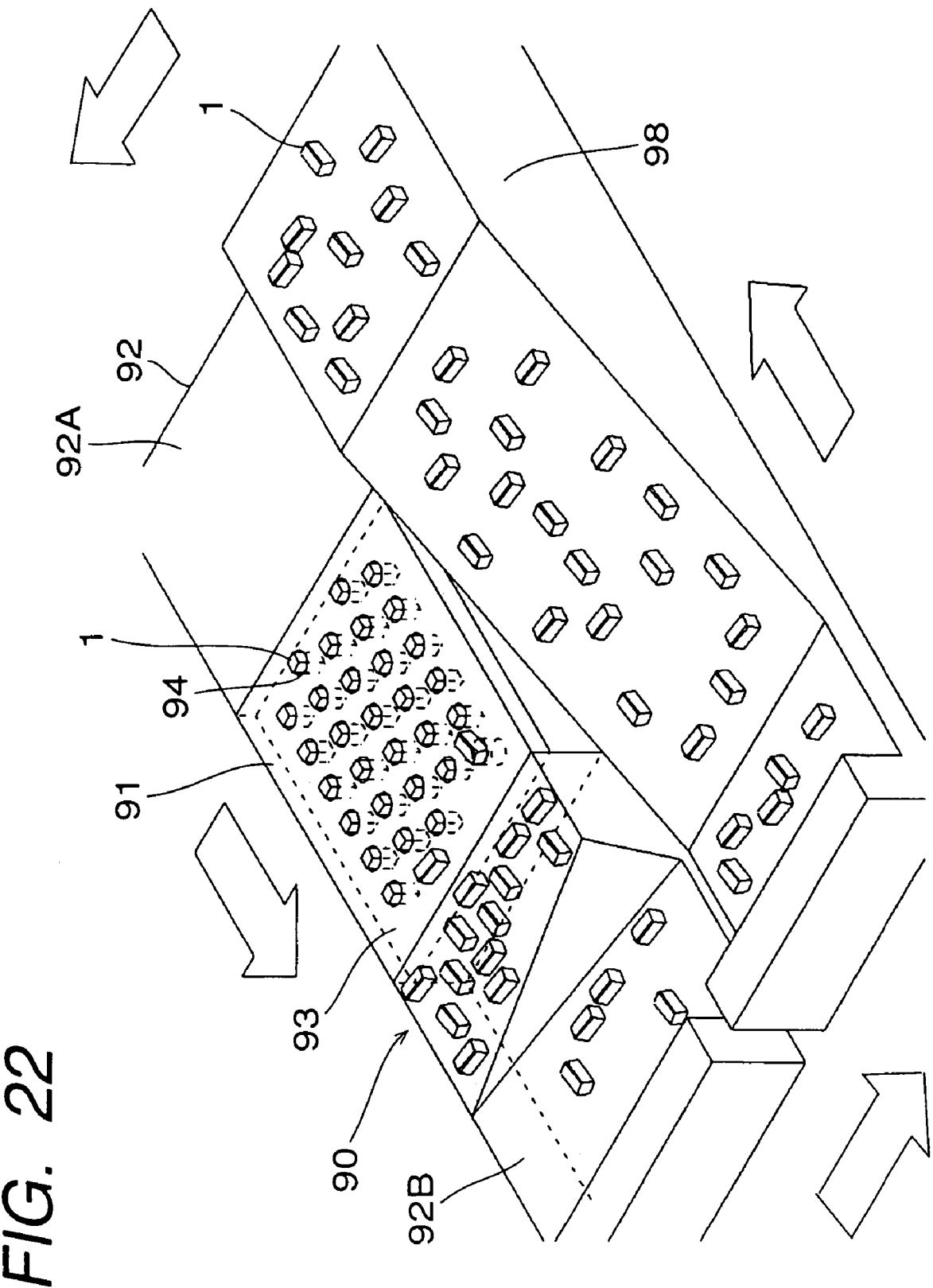
FIG. 22 is a schematic perspective view showing an arraying cartridge and a dropper in an electronic component supply unit in an embodiment of the apparatus.
Figures 23A, 23B:
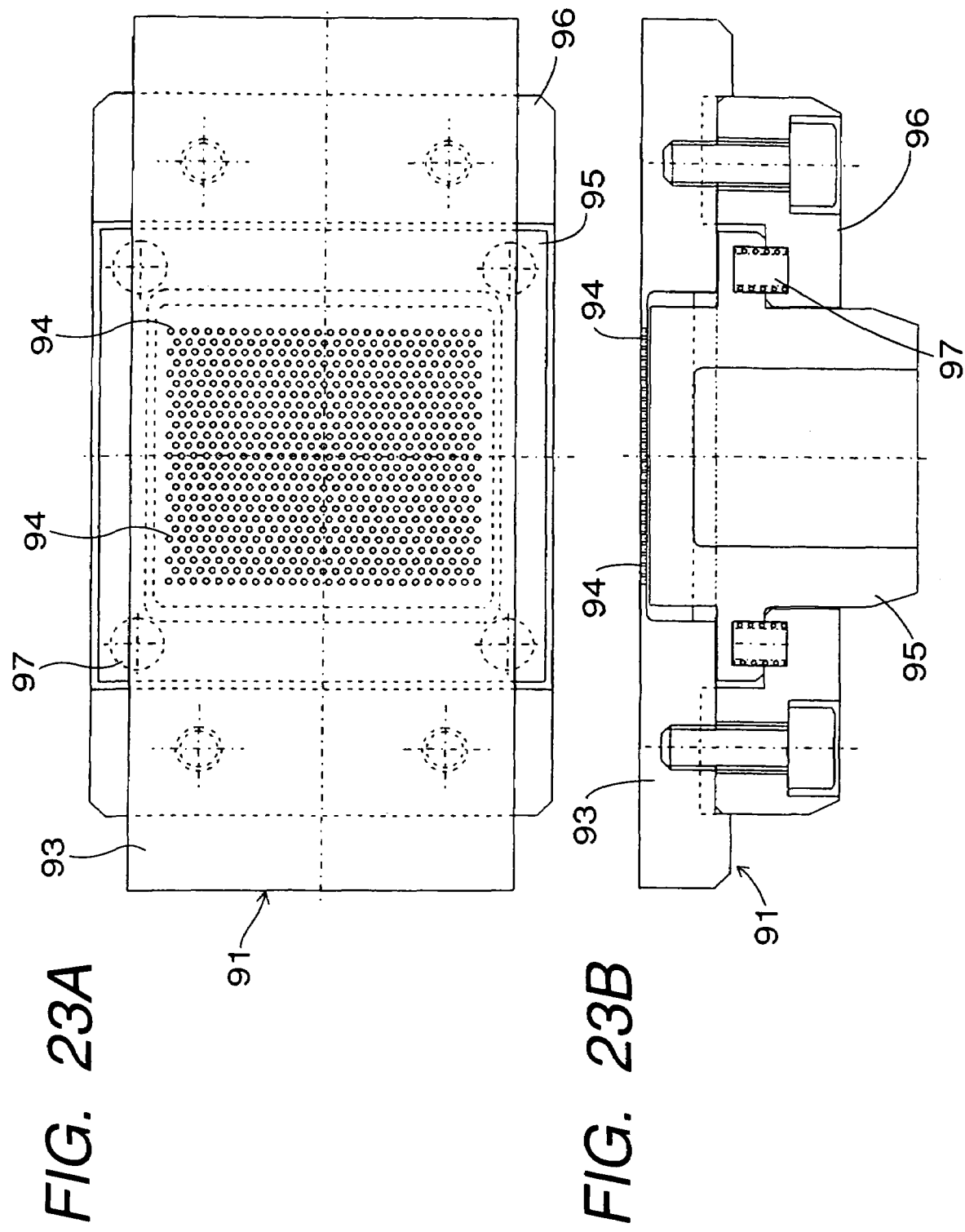
FIGS. 23A and 23B are respectively a plan view and a lateral cross-sectional view of the arraying cartridge.

FIG. 22 shows an arraying cartridge 91 and a dropper 92 provided therearound in the electronic component supply unit 90. The arraying cartridge 91 is provided, as shown in FIGS. 23A and 23B, with an arraying block 94 having a plurality of through holes 94, serving as arraying holes for the chip-style electronic components, thereby arraying the components in a standing state, a reference block 95 coming into contact with the lower surface of the arraying block thereby aligning the lower end positions of the chip-style electronic components, and a holder 96 for integrally holding the arraying block 93 and the reference block 95. However, there can be generated a gap of about 0.15 mm between the upper surface of the reference block 95 and the arraying block 93, and, for this purpose, springs 97 are provided between the holder 96 and the reference block 95 for biasing the reference block 95 upwards. The reference block 95 preferably has a flatness within 2 μm for the purpose of leveling of the coating surface of the chip-style electronic components, and is rendered vertically movable (within a range of 0.15 mm) from the aforementioned state distanced from the arraying block 93 to a state in contact therewith.

The arraying block 91 is designed exclusively for each size of the chip-style electronic components, thereby facilitating the change of the kind of the component, and also preventing the entry of cracked, chipped or defective ones of the components to the succeeding process steps.

FIGS. 24A and 24B are respectively a plan view and a lateral cross-sectional view showing the through holes 94 of the arraying block 93 in a magnified scale, while FIG. 24C is a view showing a state in which the chip-style electronic components are dropped into the arraying block 93 positioned with a gap to the reference block 95, and FIG. 24D is a view showing a state in which the reference block 95 is maintained in contact with the lower surface of the arraying block 93 for aligning the chip-style electronic components. FIGS. 24A to 24D show a preferred example for a chip-style electronic component of a type 0603 with dimensions L: 0.55 mm, W and T: 0.28 mm shown in FIG. 10. For the dimensions W. T=0.28 mm or a diagonal of 0.42 mm, there is employed a through hole 94 of a diameter of 0.5 mm. In general, the through hole is preferably a circular hole of a diameter of about 120% of the chip width (diagonal dimension). Under such setting, the chip-style electronic component 1 stands vertically by self alignment, without the correction of the posture.

The upper end of the through hole 94 is rounded and spread in a tapered shape.

Referring to FIG. 22, a dropper 92 around the arraying cartridge 91 is composed of a 45° feeder (giving vibration to the chip-style electronic components on a vibrating plane in a direction of 45° to a horizontal plane, and the arraying cartridge 91 vibrates together therewith. The dropper 92 drops the chip-style electronic components 1 from a vibrating feeder 92A, at the upstream side of the arraying cartridge 91, to the arraying cartridge 91, thereby causing the chip-style electronic components 1 to fall into the through holes 94 serving as the arraying holes formed on the arraying block 93. In more detail, the chip-style electronic component 1 is thrown forward with an angle of 45° to the horizontal plane, and the landed chip-style electronic component enters an arraying hole if an arraying hole is present in the landing spot but moves forward if the landing spot is flat. During the dropping operation, since the lower surface of the arraying block 93 is separated from the upper surface of the reference block 95 as shown in FIG. 24C, the upper ends of the chip-style electronic components do not protrude from the through holes 94. Therefore the chip-style electronic components can smoothly move on the arraying block 93 without meeting any obstacle, and smoothly enter the vacant through holes 94 in successive manner by the repetition of the dropping operation. The chip-style electronic components 1 not entering the through holes 94 of the arraying block 93 reach a vibrating feeder 92B at the downstream side of the arraying cartridge 91, and are returned by another returning linear feeder (15° vibration) 98 to the vibrating feeder 92A at the upstream side of the arraying cartridge 91.

To such arraying cartridge 91 of the electronic component supply unit 90, there is opposed downwards the adhesive-coated surface of the first adhesive tape 71, which is then pressed by the top plate to the upper ends (protruding from the upper surface of the arraying block by 0.1 mm) of the group of the chip-style electronic components 1, contained in the through holes 94 of the arraying cartridge 91 and positioned and aligned by the reference block 95 in the elevated position as shown in FIG. 24D, whereby executed is an adhering step of adhering end of the chip-style electronic components 1 to the adhesive tape 71. In this operation, the press-in amount or penetration of the electronic components into the adhesive layer of the adhesive tape 71 is selected as about 25 μm in order to obtain a stable supported posture of the chip-style electronic components. Such penetration into the adhesive is desirably about 5% of the dimension L of the chip-style electronic component, or about 50% of the thickness of the adhesive layer.

Also the rate of density of the group of the chip-style electronic components is selected as 638 units/(18×21 mm) in the example shown in FIGS. 23A and 23B, in order to generate resistance to the external perturbation by such density. Also the chip-style electronic components are arranged with a pitch of 0.8 mm as shown in FIG. 24A, thereby securing a distance for not affecting the electrode formation in the neighboring chip-style electronic components.

Figure 25:
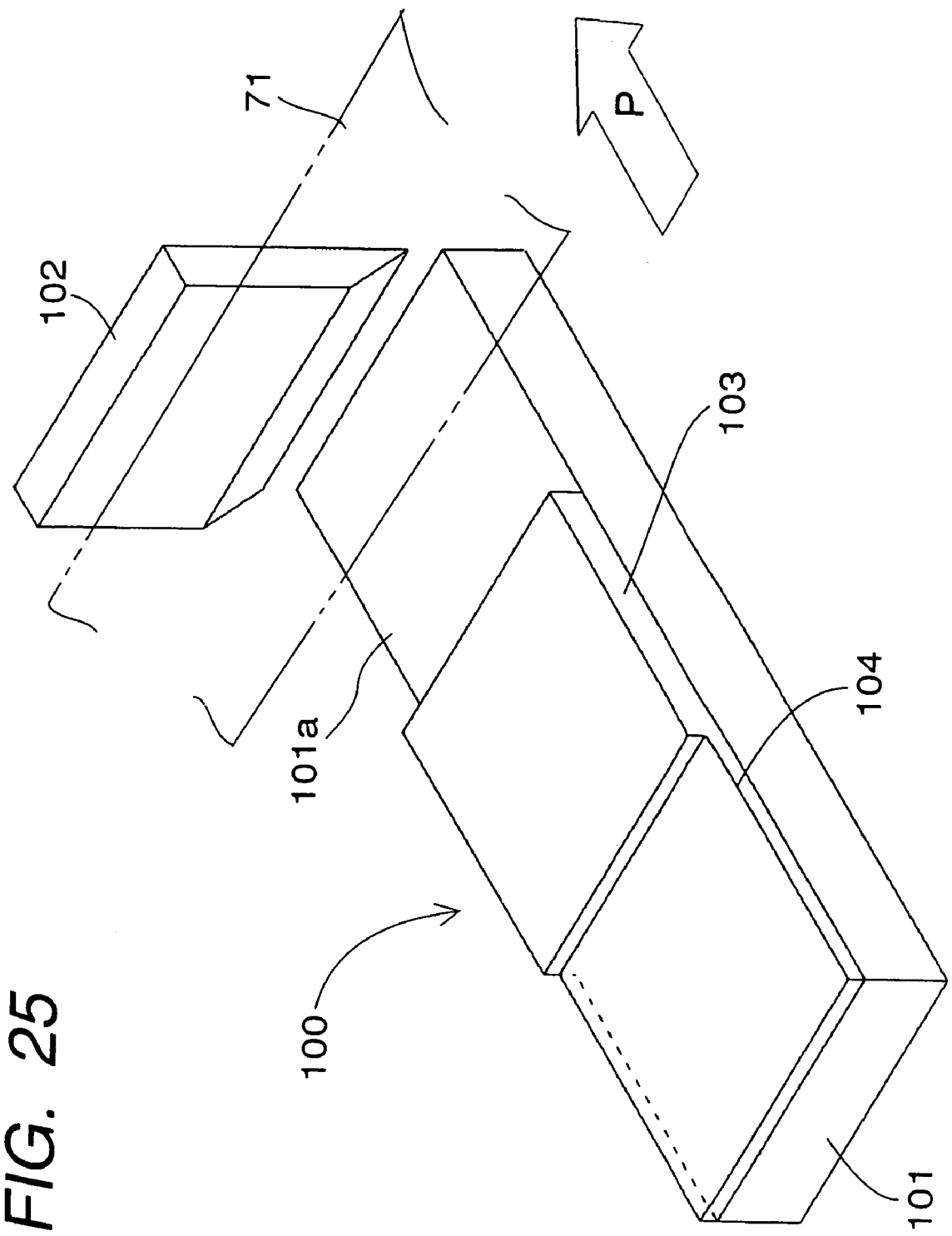
FIG. 25 is a schematic perspective view showing the principal configuration of a paste coating unit in an embodiment of the apparatus.

FIG. 25 shows a conductive paste layer formed on the coating flat bed 101 provided in the first coating unit 100. The coating flat bed 101 is positioned parallel to the first adhesive tape 71, and is rendered movable in a direction perpendicular to the running direction of the adhesive tape 71. On the other hand, a scraping blade 102 for scraping off the conductive paste is movable only in the vertical direction.

For precisely forming the conductive paste layer, the coating flat bed 101 is preferably formed with an area as small as 30 mm×100 mm, and with a flatness not exceeding 5 μm. Also the parallel level of the movement of the coating flat bed 101 is preferably maintained not exceeding 5 μm. In this manner it is rendered possible to improve the precision of electrode formation.

After the entire surface of the coating flat bed 101 is coated with the conductive paste, the scraping blade 102 is lowered to a level same as that of the upper surface of the coating flat bed 101 and the flat bed is moved by a predetermined amount in a direction P, whereby a paste-free area 101a is formed on the coating flat bed 101. Then the scraping blade 102 is maintained at a position higher by 0.15 mm than the upper surface of the coating flat bed 101 and the coating flat bed 101 is moved by a predetermined amount in the direction P, thereby forming a dipping conductive paste layer 103 of a thickness of 0.15 mm. Then the scraping blade 102 is maintained at a position higher by about 30 μm than the upper surface of the coating flat bed 101 and the coating flat bed 101 is moved by a predetermined amount in the direction P, thereby forming a blotting conductive paste layer 104 of a thickness of 30 μm.

In this manner the dipping conductive paste layer 103 and the blotting conductive paste layer 104 are formed in advance. Then the first adhesive tape 71 is lowered to immerse (dip), into the dipping conductive paste layer 103, the lower ends of the group of the chip-style electronic components attached to the first adhesive tape 71, thereby forming terminal electrodes on the ends of the chip-style electronic components 1 (first operation). After the first adhesive tape 71 is returned to the elevated position, the coating flat bed 101 is so moved that the blotting conductive paste layer 104 is opposed to the adhesive tape 71, and the first adhesive tape 71 is lowered to bring the lower ends of the chip-style electronic components 1 in contact with the blotting conductive paste layer 104, thereby returning the excessive conductive paste on the chip-style electronic components 1 to the coating flat bed 101 by blotting (second operation). The blotting conductive paste layer 104 is provided in order to facilitate the transfer of the conductive paste from the chip-style electronic components 1 to the coating flat bed 101 by the mutual contact of the conductive paste layers, and, in principle, there can be utilized a blotting conductive paste layer 104 that has a zero thickness, namely an uncoated surface.

After each cycle of the dipping and blotting operations for the group of the chip-style electronic components, the scraping blade 102 is lowered and the coating flat bed 101 is moved to scrape off the used conductive paste. In this manner it is rendered possible to drastically reduce the dropping of the electronic components or the defective electrode formation resulting from contamination with undesirable substances.

The second paste coating unit 140 has a configuration similar to that of the first paste coating unit 100 explained above.

Figure 26A:
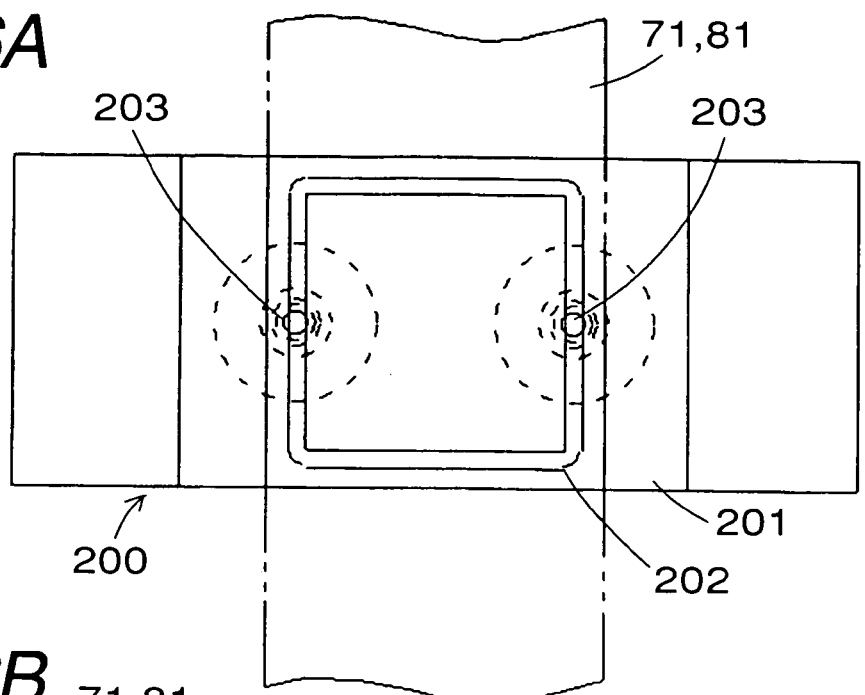
FIGS. 26A, 26B and 26C are respectively an elevation view, a cross-sectional view and a lateral view of a tape guide in an embodiment of the apparatus.
Figure 26B:
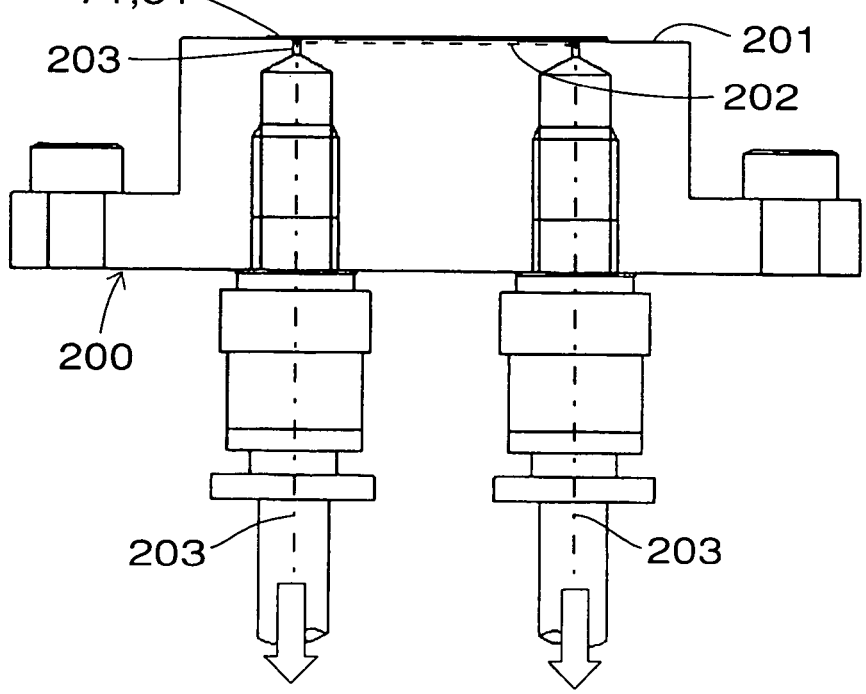
Figure 26C:
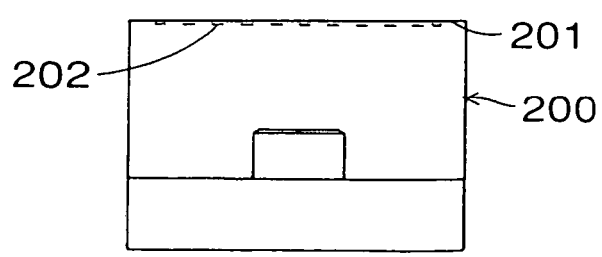

FIGS. 26A to 26C illustrate the configuration of a tape guide 200, which is provided at least at the tape winding side and the tape feeding side of the first and second paste coating units 100, 140 for sucking the uncoated surface of the first and second adhesive tapes 71, 81, thereby preventing skewing or slack feeding of the tapes. As shown in FIGS. 26A to 26C, the tape guide 200 is provided with a guide surface 201 on which the adhesive tape 71 or 81 slides and which is provided with a vacuum suction groove 202 of a square ring shape of a width somewhat smaller than the width of the adhesive tape. The vacuum suction groove 202 is connected to a vacuum system through a vacuum suction path 203 at the back.

Figure 27:
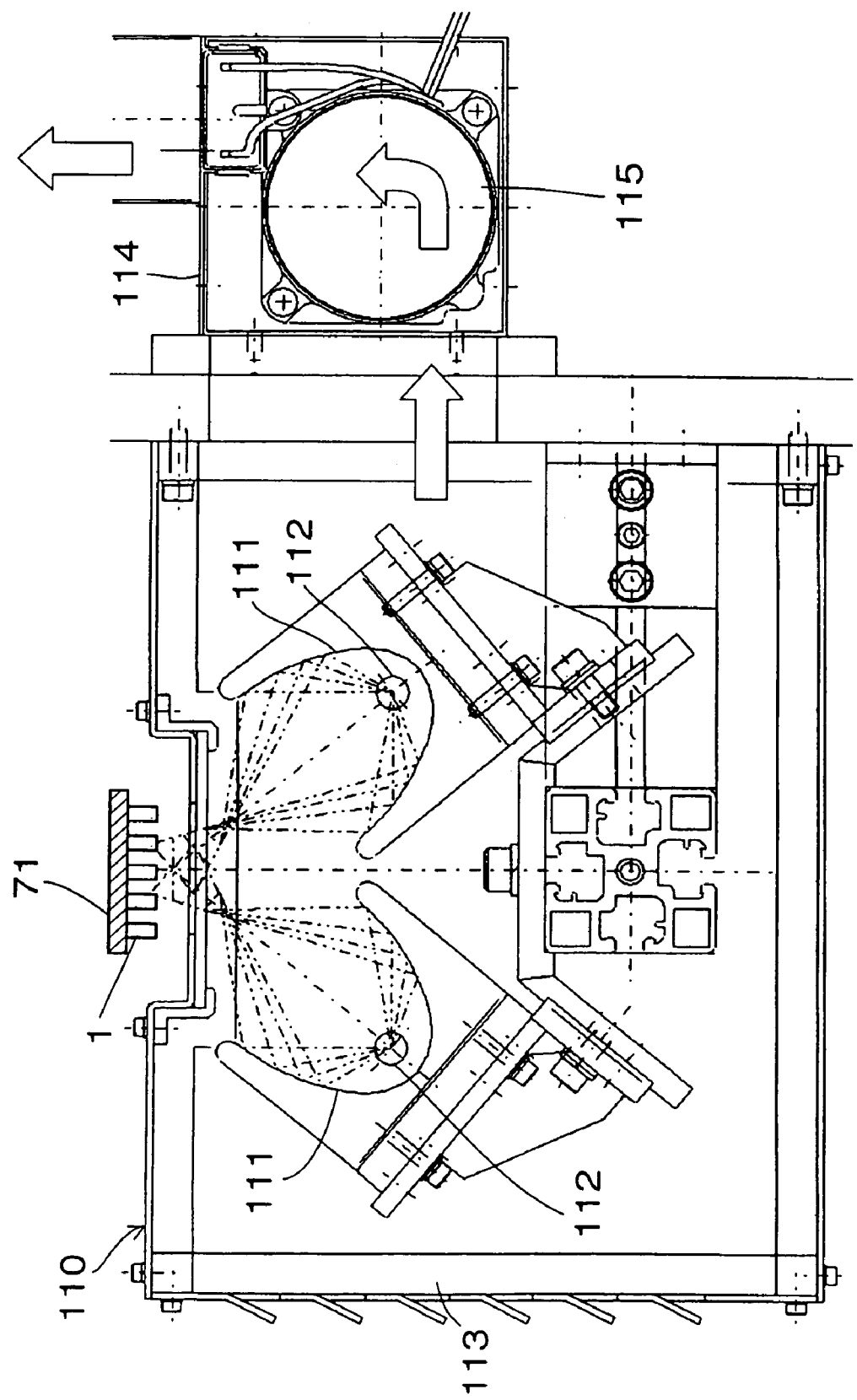
FIG. 27 is a lateral cross-sectional view of a drying unit in an embodiment of the apparatus.

FIG. 27 shows the configuration of the first drying unit 110, which is provided with two sets of a structure having a halogen lamp 112 at the center of a light concentrating surface 111. More specifically, in a casing 113 of the drying unit, there are provided a pair of structures each containing the halogen lamp 112 at the center of the light concentrating surface 111, with an irradiating angle of about 40° to 45° to a normal line to the first adhesive tape 71, so as to radiate the far-infrared light to the paste-coated portions (lower ends) of the chip-style electronic components 1 attached to the first adhesive tape 71.

The irradiating angle of about 40° to 45° is selected because also the adhesive tape 71 tends to be heated if the irradiation is executed from directly under the chip-style electronic components 1.

Also in order to suppress the elevation of the atmospheric temperature by the heat from the lamps 112, the casing 113 is enclosed except the light transmitting portion and forced air discharge is executed by a blower 115 in an exhaust unit 114 connected to the casing 113.

Also the second drying unit 150 has a similar configuration.

Figure 28A:
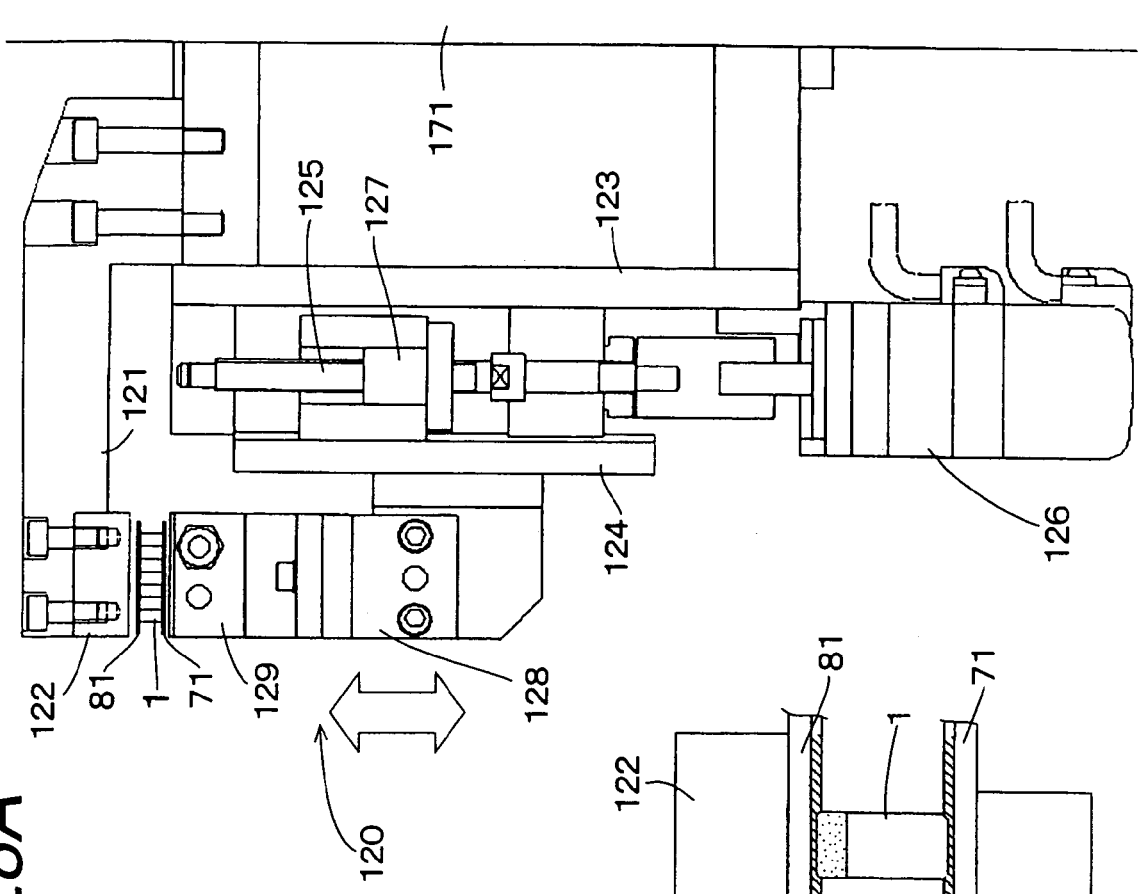
FIGS. 28A and 28B are lateral cross-sectional views of a transfer unit in an embodiment of the apparatus.

FIG. 28A shows the configuration of the transfer unit 120, in which a reference block 121, constituting the upper top plate, is supported and fixed by a frame 171 through a support member 121. The reference block 122 is provided with a tape holding mechanism by vacuum suction, in order to hold the second adhesive tape 81.

On the frame 171, there is also fixed a mounting base 123, holding a slider 124 in vertically slidable manner. The mounting base 123 rotatably supports a vertical ball screw shaft 125, which is rotated by a servo motor 126 fixed to the mounting base 123. The slider 124 is provided with a ball screw nut 127 engaging with the ball screw shaft 125 so that the slider 124 is vertically moved by the rotation of the ball screw shaft 125 by the servo motor 126. A hot plate 129 constituting a lower flat support plate, parallel and opposed to the flat surface of the aforementioned reference block 122, is fixed to the vertically movable slider 124 through a support member 128.

Figure 28B:
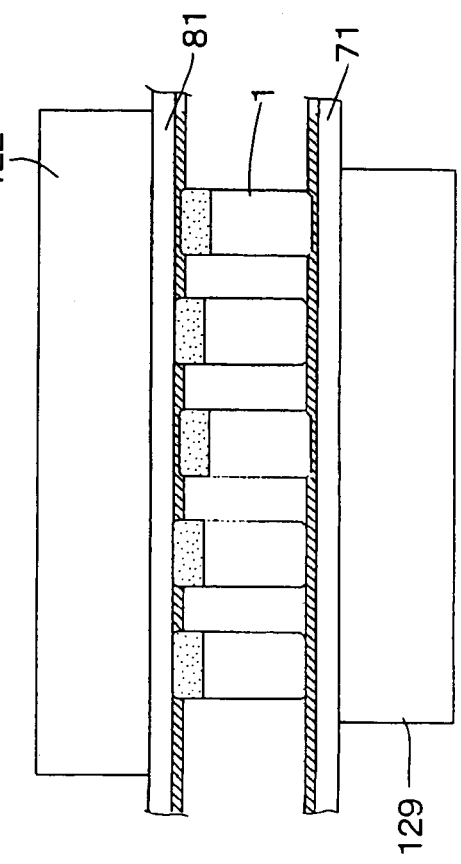

As shown in FIG. 28B which is a magnified view seen from a lateral direction in FIG. 28A, the reference block 122 and the hot plate 129 sandwich the first adhesive tape 71 and the second adhesive tape 81 to adhere the second adhesive tape 81 to the group of the chip-style electronic components 1 and to heat the first adhesive tape 71 by the hot plate 129, thereby causing foam generation in the first adhesive tape 71 and lowering the adhesive force thereof (less than 0.15 N/20 mm). For example, the first adhesive tape 71 (foaming temperature 150° C.) is heated for 10 seconds at 170° C. by the hot plate in order to execute foam generation. As the adhesive increases volume at the foam generation, the distance of the reference block 122 and the hot plate 129 is increased accordingly (about 0.1 mm).

Thereafter the slider 124 and the hot plate 129 are lowered whereby the chip-style electronic components 1 supported between the first adhesive tape 71 and the second adhesive tape 81 are adhered to and supported by the second adhesive tape 81, and are conveyed together with the second adhesive tape 81 by the rotation of the drive roller 94.

In the following there will be explained the entire functions of the apparatus.

The first adhesive tape 71 is fed by a predetermined amount by the drive roller 74, with the adhesive-coated surface downwards, and is pressed by the top plate, in the electronic component supply unit 90 shown in FIG. 22, to the upper ends of the group of the chip-style electronic components 1 contained in the through holes 94 of the arraying cartridge 90 and positioned and aligned as shown in FIG. 24D. Thus there is executed the adhering step for adhering, to the adhesive tape 71, the ends of the positioned and aligned chip-style electronic components 1.

After the adhering step, the group of the chip-style electronic components 1 held by the first adhesive tape 71 is transferred to the first paste coating unit 100. In this position, the lower ends of the chip-style electronic components 1 are at first dipped in the dipping conductive paste layer 103 on the coating flat bed 101 shown in FIG. 25, and then are brought into contact with the blotting conductive paste layer 104 by the movement of the coating flat bed 101, whereby the excessive conductive paste is returned and the electrodes are formed with the appropriate amount of the conductive paste (coating step).

After the coating step, the chip-style electronic components 1 are transferred, by the running of the first adhesive tape 71, to the first drying unit 110 shown in FIG. 27, in which the conductive paste and the chip-style electronic components are heated to 110° C. to 120° C., while the tape 1 is retained within a range from the ordinary temperature to about 60° C. For this purpose light irradiation with far-infrared lamps 112 is employed for heating and is made locally to the paste-coated portions of the chip-style electronic components from oblique directions thereunder, thereby only heating the chip-style electronic components and the conductive paste and not heating other components.

After the drying step in the first drying unit 110, the group of the chip-style electronic components 1 is reversed by the drive roller 74 to a state where the adhesive-coated surface is upwards, and is conveyed to the transfer unit 120 shown in FIGS. 28A and 28B. The first and second adhesive tapes are sandwiched by the reference block 122 and the hot plate 129 in such a manner that the first adhesive tape 71 at the lower side has the adhesive-coated surface upwards while the second adhesive tape 81 at the upper side has the adhesive-coated surface downwards, and the first adhesive tape 71 (foaming at 150° C.) is heated for 10 seconds at 170° C. by the hot plate to execute foam generation and to lower the adhesive force thereof. As the adhesive increases volume at the foaming, the hot plate 129 has to be retracted accordingly (escaping by lowering of about 0.1 mm). Thereafter the chip-style electronic components 1 are attached to the second adhesive tape 81 and are moved by the running motion thereof.

The group of the chip-style electronic components 1 transferred to the second adhesive tape 81 is transferred to the leveling unit 130, which, not illustrated in detail, corrects the defective posture of the chip-style electronic components and executes alignment of the lower ends of the chip-style electronic components by pressing the lower ends to a reference plane.

After the alignment in the leveling unit 130, the group of the chip-style electronic components supported by the second adhesive tape 81 is conveyed to the second paste coating unit 140 for coating the uncoated ends of the chip-style electronic components with an appropriate amount of the conductive paste in the same manner as in the first paste coating unit 100.

After the coating step, the group of the chip-style electronic components is conveyed by the running motion of the second adhesive tape 81 to the second drying unit 150 for executing a drying process similar to that in the first drying unit 110.

After the drying process in the second drying unit 150, the group of the chip-style electronic components is transferred to the discharge unit 160, in which the second adhesive tape 81 (foaming at 170° C.) is heated for 10 seconds at 190° C. by the hot plate, whereby the second adhesive tape 81 causes foaming and loses the adhesive force. Thus the chip-style electronic components drop by the weight thereof into the discharge box and are contained therein.

Annexed Tables 1 to 3 show the dimension and penetration of the adhesive corresponding to each size of the chip-style electronic component, the adhesive forces (or adhesion) of the adhesives to be used in the first and second adhesive tapes, and the dimension of the arraying holes of the cartridge corresponding to each chip size.

The foregoing embodiment of the terminal electrode forming apparatus for the chip-style electronic components, explained with reference to FIGS. 16 to 28A and 28B, provides the following advantages:

(1) On a group of the chip-style electronic components, electrode formation is executed at first on one ends of such components by conveying the components with the first adhesive tape 71 and by coating the conductive paste on such ends, and then on the other ends by transferring the components to the second adhesive tape 81 and by applying the conductive paste on such other ends. Thus the terminal electrode forming steps on both ends of the chip-style electronic components can be automated, with an improvement in the mass producibility.

(2) The apparatus includes the steps of adhesion of the chip-style electronic components, conductive paste coating, paste drying, and chip component peeling by the first adhesive tape 71 and the steps of transfering adhesion of the chip-style electronic components, conductive paste coating, paste drying and chip component peeling by the second adhesive tape 81 in a substantially same vertical plane and in two stages of different levels, thus reducing the required floor area and achieving space saving.

(3) The running direction of the first adhesive tape 71 from the feeding thereof to the adhesion of the chip-style electronic components, coating and drying of the conductive paste is selected opposite to the running direction of the second adhesive tape 81 from the feeding thereof to the adhesion (transfer) of the chip-style electronic components, coating and drying of the conductive paste, while the running direction of the first adhesive tape 71 after the reversing thereof to the transfer of the chip-style electronic components is selected same as that of the second adhesive tape 81, whereby the steps associated with the first adhesive tape 71 and those associated with the second adhesive tape 81 can be positioned within a vertical plane to achieve space saving in the apparatus, and the supply and discharge of the chip-style electronic components can be executed in a substantially same work site.

(4) The chip-style electronic components are conveyed to the steps of conductive paste coating and drying while they are attached to the downward adhesive-coated surface of the first adhesive tape 71 or the second adhesive tape 81, and the chip-style electronic component eventually peeled from the adhesive tape merely drops, so that the defective components are not mixed into the succeeding steps. Also the terminal electrode formation on the chip-style electronic components is always executed at the lower side thereof, so that the process matches the direction of gravity and allows to maintain a high precision in the electrode formation.

(5) In the electronic component supply unit 90, there is employed an arraying cartridge 91 exclusively matching the size of the chip-style electronic components, thereby allowing prompt change of the kind of the components. Also a cracked, chipped or abnormal component eventually present is left in the cartridge 91 and is not supplied to the succeeding step. Also the chip-style electronic components are free from the damage, since they are transferred from the arraying cartridge 91 by merely adhering them to the adhesive tape 71.

(6) The conductive paste requires a drying time of about 180 seconds at 180° C. in the conventional convection drying method. However, the adhesive tape is incapable of holding the chip-style electronic components under such conditions because the adhesive loses the adhesive force by foam formation at about 150° C. In the present embodiment, such difficulty is avoided by heating the conductive paste and the chip-style electronic components to 110° C. to 120° C. in the drying unit 110 or 150 but maintaining the adhesive tape itself within a range from the normal temperature to about 60° C. For this purpose, there is employed heating by light with the far-infrared lamps 112, and the paste coated portion is locally irradiated with the far-infrared light from obliquely under the group of the chip-style electronic components, whereby the components and the conductive paste alone are brought to the desired temperature while other parts are not heated. Irradiation of the group of the chip-style electronic components from the vertical direction will require a higher energy because the irradiation is made only to the conductive paste and not to the chip-style electronic components themselves. In such case the adhesive tape will show an increase in temperature, with the resulting foam generation, due to an increased energy irradiation to the adhesive tape. Also the increase in the atmospheric temperature by the heat from the lamps 112 is suppressed by employing an enclosed structure which is open only in the light transmitting portion and discharging heat by the blower 115.

(7) The chip-style electronic components are fixed in a state suspending from the first or second adhesive tape. At the transfer from the first adhesive tape 71 to the second adhesive tape 81, the first adhesive tape 71 is reversed so that the chip-style electronic components are positioned upwardly on the first adhesive tape 71. Therefore, the chip-style electronic component failing the transfer operation drops on the first adhesive tape, so that any defective component is not mixed in the transferred components. Also the components are less susceptible to the external perturbation by gravity, in the electrode formation and in the conveying operation.

(8) The configuration of the present embodiment allows to realize a chip leveling precision not exceeding 5 μm and a flucgtuation in the dimension B of the chip-style electronic component not exceeding 40 μm.

Figure 29:
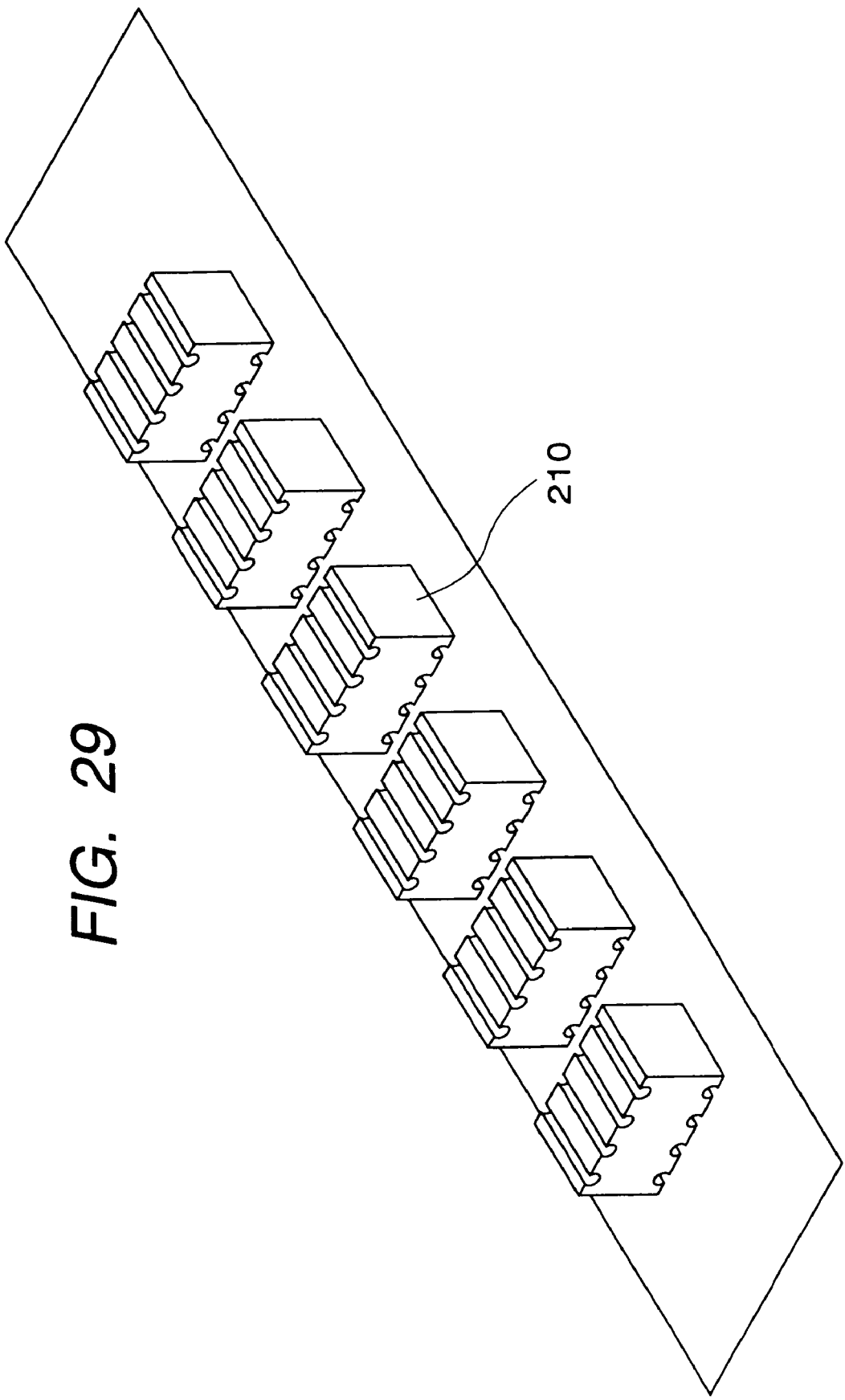
FIG. 29 is a perspective view showing another example of the chip-style electronic component to which the present invention is applicable.

The present invention is applicable not only to a single-terminal component shown as the chip-style electronic component in the foregoing embodiment, but also to an array chip 210 having plural terminals at an end as shown in FIG. 29 (a multi-terminal chip-style electronic components). In such case, the pattern of the dipping conductive paste layer on the paste coating unit has to be adapted to such plural terminals.

The present invention has been described by preferred embodiments thereof, but the present invention is by no means limited by such embodiments and is subject to various modifications and alterations within the scope and spirit of the appended claims.

As explained in the foregoing, the terminal electrode forming method and apparatus of the present invention for the chip-style electronic components employs conveying operation by only adhering to the adhesive, thereby avoiding the drawbacks in the conventonal methods utilizing silicone rubber holes or mechanical chucks, and thus achieving simplicity. Also they can be adapted to the miniature-sized chip-style electronic components that have been considered impossible to handle in the conventional method or apparatus. It is furthermore rendered possible to absorb the fluctuation in the external dimension or the abnormal shape by the deformation of the adhesive, so that the precision of alignment of the coating surfaces of the chip-style electronic components is drastically improved in comparison with the conventional technology. There can also be expected an improvement in the stability of operation of the apparatus and in the production yield.

Furthermore, the steps can be further simplified by employing a thermal foaming-release adhesive as the adhesive material.

Furthermore, the clarification of the drying mechanism allows to achieve a reduction of the drying time, an improvement in the reliability and a simplification of the apparatus.

Furthermore, many kinds of the components can be handled in a simple manner with a limited number of interchangeable parts, and the mass production is also made possible.

TABLE 2

| | Adhesion | |
|---|---|---|
| | Adhesion (desirable range) | Adhesion (best value) |
| First tape | 2 to 3 N/20 mm | 2.4 N/20 mm |
| Second tape | 3 to 4 N/20 mm | 3.7 N/20 mm |

TABLE 3

| | Arraying hole dimension (mm) | |
|---|---|---|
| Chip size | Arraying hole (desirable range) | Arraying hole (best value) |
| 1005 | 0.75 mm | W, T diagonal dimension × 120% |
| 0603 | 0.5 mm | W, T diagonal dimension × 120% |
| 0402 | 0.35 mm | W, T diagonal dimension × 120% |

What is claimed is:

1. An electronic components holding system for holding a plurality of electronic components of chip-style when a predetermined processing is respectively applied onto both tip end portions of each of the electronic components, said system comprising:

a first tape having a first adhesive layer which is formed on one surface of the first tape and made of a thermal foaming-release adhesive which allows to hold one of tip end portions of each of the electronic components;

a second tape having a second adhesive layer which is formed on one surface of the second tape and made of a thermal foaming-release adhesive which allows to hold another of the tip end portions of each of the electronic components;

an electronic components providing unit for adhering the electronic components on the first adhesive layer of the first tape at the one of the tip end portions thereof, in a manner in which the electronic components are arrayed;

a transfer unit for adhering the electronic components on the second adhesive layer of the second tape at the another of the tip end portions thereof, and closely contacting to another surface of the first tape and heating the first adhesive layer through the first tape so as to release the electronic components from the first adhesive layer by foaming the first adhesive layer, so that the electronic components are transferred to the second tape; and a heat-discharging unit for closely contacting to another surface of the second tape and heating the second adhesive layer through the second tape so as to release the electronic components from the second adhesive layer by foaming the second adhesive layer,

TABLE 1

| | Adhesive dimension and penetration (mm) | | | | | | |
|---|---|---|---|---|---|---|---|
| Chip size | Dimension L | Dimension W, T | Dimension B | Adhesive film thikness (desirable range) | Adhesive film thickness (best value) | Penetraton (desirable range) | Penetration (best value) |
| 1005 | 0.95 | 0.48 | 0.2 | 0.075 to 0.095 | L × 10% | 0.035 to 0.045 | L × 5% |
| 0603 | 0.55 | 0.28 | 0.15 | 0.045 to 0.055 | L × 10% | 0.020 to 0.030 | L × 5% |
| 0402 | 0.35 | 0.18 | 0.1 | 0.025 to 0.035 | L × 10% | 0.015 to 0.020 | L × 5% | wherein a foaming temperature of the second adhesive layer is higher than a foaming temperature of the first adhesive layer.

2. An electronic components holding system for holding a plurality of electronic components of chip-style when a predetermined processing is respectively applied onto both tip end portions of each of the electronic components, said system comprising:

a first tape driving system for intermittently driving a first tape having a first adhesive layer which is formed on one surface of the first tape, and adhesively holds one of tip end portions of each of the electronic components;

a second tape driving system for intermittently driving a second tape having a second adhesive layer which is formed on one surface of the second tape, and adhesively holds another of the tip end portions of each of the electronic components;

an electronic components providing unit for adhering the electronic components on the first adhesive layer of the first tape at the one tip end portions thereof, in a manner in which the electronic components are arrayed; and a transfer unit for adhering the electronic components on the second adhesive layer of the second tape at the another of the tip end portions thereof, and releasing the electronic components from the first adhesive layer, so that the electronic components are transferred to the second tape, wherein the first tape driving system has a drive roller which is located between the electronic components providing unit and the transfer unit, and which changes a direction along which the first tape is intermittently driven so to set the first adhesive layer of the first tape to face to the second adhesive layer of the second tape.

* * * * *